US008625990B2

(12) United States Patent
Yu

(10) Patent No.: US 8,625,990 B2

(45) Date of Patent: Jan. 7, 2014

(54) OPTICAL LINE TERMINAL, REMOTE NODE UNIT, OPTICAL TRANSMISSION METHOD AND SYSTEM THEREOF

(75) Inventor: Fan Yu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 929 days.

(21) Appl. No.: 12/766,533

(22) Filed: Apr. 23, 2010

(65) Prior Publication Data

US 2010/0202774 A1 Aug. 12, 2010

Related U.S. Application Data

(63) Continuation of application No. PCT/CN2008/072823, filed on Oct. 24, 2008.

(30) Foreign Application Priority Data

Oct. 25, 2007 (CN) .......................... 2007 1 0167350

(51) Int. Cl.
*H04J 14/00* (2006.01)

(52) U.S. Cl.
USPC .................................. 398/66; 398/70; 398/72

(58) Field of Classification Search
USPC ...................................................... 398/66–74
See application file for complete search history.

(56) References Cited

U.S. PATENT DOCUMENTS

H2075 H 8/2003 Gnauck et al.
6,868,232 B2 * 3/2005 Eijk et al. .......................... 398/5
2004/0184806 A1 9/2004 Lee et al.
2005/0286903 A1 12/2005 Jennen et al.
2006/0104638 A1 * 5/2006 Chung et al. .................... 398/71
2006/0127093 A1 6/2006 Park et al.

(Continued)

FOREIGN PATENT DOCUMENTS

CN 1701543 A 11/2005
CN 1983906 A 6/2007
JP 2006-191604 A 7/2006
WO WO 2007/071154 A1 6/2007

OTHER PUBLICATIONS

International Search Report dated Feb. 5, 2009 in connection with PCT Application No. PCT/CN2008/072823.
Translation of of Office Action dated Apr. 25, 2011 in connection with Chinese Patent Application No. 200710167350.7.

(Continued)

*Primary Examiner* — Dzung Tran

(57) ABSTRACT

An optical line terminal (OLT), a remote node (RN) unit, and an optical transmission method and a system thereof are provided. The method includes following steps. Power splitting is performed respectively on a part or all of M optical signals which have different wavelengths and are generated by M light sources, thus forming a first group of optical signals including first split optical signals and a second group of optical signals including second split optical signals. Both the first group of optical signals and the second group of optical signals have N different wavelengths. Cross routing is performed on the first group of optical signals and the second group of optical signals to form N carrier groups of signals that need to be provided to N optical network units (ONUs). Therefore, problems in the prior art such as a great number of light sources, high costs, and low reception quality, low power efficiency or high costs of the light sources are solved, so that the number of light sources in the network is reduced, transmission quality of signals is improved, and system costs are reduced.

7 Claims, 21 Drawing Sheets

(56) References Cited

U.S. PATENT DOCUMENTS

| | | | | |
|---|---|---|---|---|
| 2006/0140631 | A1 | 6/2006 | Brolin | |
| 2006/0146855 | A1 * | 7/2006 | Kani et al. | 370/430 |
| 2006/0222365 | A1 | 10/2006 | Jung et al. | |
| 2007/0177873 | A1 * | 8/2007 | Hyun et al. | 398/72 |
| 2007/0189772 | A1 | 8/2007 | Hyun et al. | |

OTHER PUBLICATIONS

Written Opinion of the International Searching Authority dated Feb. 5, 2009 in connection with PCT Application No. PCT/CN2008/072823.

Supplementary European Search Report dated Dec. 22, 2010 in connection with European Patent Application No. EP 08 84 4454.

* cited by examiner

OPTICAL LINE TERMINAL, REMOTE NODE UNIT, OPTICAL TRANSMISSION METHOD AND SYSTEM THEREOF

CROSS-REFERENCE TO RELATED APPLICATIONS

This application is a continuation of International Application No. PCT/CN2008/072823, filed on Oct. 24, 2008, which claims priority to Chinese Patent Application No. 200710167350.7, filed on Oct. 25, 2007, both of which are hereby incorporated by reference in their entireties.

FIELD OF THE TECHNOLOGY

The present invention relates to the field of network communications technology, particularly to an optical line terminal (OLT), a remote node (RN) unit, and an optical transmission method and a system thereof, and more particularly to an OLT, an RN unit, and an optical transmission method and a system thereof capable of reducing the number of light sources in an optical network in a wavelength division multiplexing (WDM) system.

BACKGROUND OF THE INVENTION

Currently, a common feature of optical access technologies is that optical signals between an optical line terminal (OLT) and an optical network unit (ONU) are distributed through an optical splitter, and upstream and downstream carriers separately adopting different wavelengths are transmitted for data transmission.

An optical network system in the prior art has large optical attenuation, and a conventional passive optical network (PON) technology is limited on aspects such as the transmission distance and the split ratio. Each ONU obtain a limited upstream bandwidth, so that the demand for high-bandwidth services such as high resolution digital service is hard to be satisfied.

For the situation of the optical network system in the prior art, problems of the PON technology can be solved by introducing a wavelength division multiplex (WDM) technology in the access network. As shown in FIG. 1, each ONU is assigned with two different wavelengths for transmitting upstream and downstream carriers each. An OLT is placed in a central office (CO) as shown in FIG. 1. The OLT employs a multi-wavelength light source. The data transmitted to an ONU1, an ONU2, . . . , and an ONUn in a downstream direction is sent after being modulated on optical carriers having wavelengths λ1, λ2, . . . , λn respectively. Signals are distributed through a passive remote node (RN) to destination ONUs so as to implement the downstream transmission. During the upstream transmission, a channel competition problem among the ONUs is solved by means of wavelength-division multiplexing access (WDMA). Each ONU uses a specific wavelength to carry upstream data. As shown in FIG. 1, n ONUs carry upstream data on optical carriers having wavelengths λ1*, λ2*, . . . , and λn* respectively, and timing and network synchronization are unnecessary. The upstream signals are uploaded through a wavelength grating router (WGR) to a receiving end of the OLT, for example, uploaded to the receiving end of the OLT through an arrayed waveguide grating (AWG) in FIG. 1. But, compared with other broadband access modes, the WDM-PON in the prior art has a very high initial investment and high costs because a lot of light sources need to be used in the system. As shown in FIG. 1, for a system having N ONUs, and each ONU uses upstream and downstream carrier signals having different wavelengths, the WDM-PON system 2N light sources. For some WDM systems, each ONU needs two upstream carriers to obtain high upstream modulation signal power. For a system having N ONUs, each ONU occupies three optical carriers, that is, one downstream carrier signal having a wavelength and two upstream carrier signals having different wavelengths are used, so the system uses 3N light sources. To reduce the number of light sources in the PON system, the following two modes are mainly used in the prior art.

Mode 1: Re-modulation is used at the ONU.

For a system having N ONUs, each ONU uses the same wavelength for transmitting upstream and downstream signals, and N light sources are used in the system, so that the total number of light sources can be reduced to half of the number in the system shown in FIG. 1. Specifically, the ONU divides downstream optical signals carrying downstream data from the OLT into two parts. One part of the downstream optical signals is used for detecting and recovering downstream data. The other part downstream optical signals is used for sending the upstream data, and the upstream data is re-modulated into this part of downstream light and then sent back to the OLT. As shown in FIG. 2, the upstream and downstream data of each ONU are carried at the same wavelength. No light source is disposed at the ONU and the light sources are only disposed at the OLT.

Although the number of light sources can be reduced in mode 1, for the re-modulation mode at the ONU, the downstream data carried at downstream light influences modulation of upstream data, thus influencing reception quality of upstream data at the OLT in the system.

Mode 2: The mode is based on broadband light source (BLS) spectrum splitting.

Two high power BLSs are configured at the OLT. The BLS spectrum splitting method is used to provide downstream optical carriers and upstream optical carriers for the OLT and the ONUs respectively. For the BLSs in FIG. 3, a second BLS is configured to provide wavelength-locked light sources for the OLT, and a first BLS is configured to provide wavelength-locked light sources for the ONUs. After performing spectrum splitting by the demultiplexer (DEMUX) on broad spectrum light beam emitted by the BLSs, a series of narrow spectrum light beams are obtained. The narrow spectrum light beams are injected in a series of receiving/sending portions of the OLTs or ONUs placed inside the CO to generate injection locked light sources, as shown in FIG. 3.

In the spectrum splitting mode, a broad spectrum light beam is split into a plurality of narrow spectrum light beams. Because spectrum gaps exist between the narrow spectrum light beams, power efficiency of the light source is low. In addition, the high power BLS devices are still immature with high costs.

In the prior art, a WDM system needs to use a lot of light sources. Although methods for reducing the number of light sources are provided in the prior art, problems such as low transmission quality of signals, low power efficiency of light source or high costs.

SUMMARY OF THE INVENTION

A first objective of the present invention is to provide an optical transmission method to solve problems in an existing optical network system, such as a great number of light sources and high costs, and problems in conventional technical solutions of reducing the number of light sources in a network, such as low transmission quality of signals and low power efficiency of light source, thus reducing the number of light sources in the network, improving reception quality, and reducing system costs.

A second objective of the present invention is to provide an optical line terminal (OLT), which is configured to solve problems in conventional technical solutions of reducing the number of light sources in a network for the OLT, such as the requirement for additional high power broadband light source (BLS) devices, low power efficiency of light source, high costs, or low reception quality, thus reducing the number of light sources in the network, improving transmission quality of signals, and reducing system costs.

A third objective of the present invention is to provide a remote node (RN) unit, which is configured to solve problems in an existing optical network system, such as a great number of light sources and high costs, thus reducing the number of light sources in the network, improving transmission quality of signals, and reducing the system costs.

A fourth objective of the present invention is to provide an optical transmission system, which is configured to solve problems in an optical network system in the prior art, such as a great number of light sources and high costs, and problems in conventional system of reducing the number of network light sources, such as low reception quality and low power efficiency of light source, thus reducing the number of light sources in the network, improving transmission quality of signals, and reducing system costs.

To realize the first objective, the present invention provides an optical transmission method, in which M light sources at an OLT provide K carriers for N optical network units (ONUs). M, N, and K each are integers greater than 1, and K>M>=N. The method includes the following steps.

M light sources generate M optical signals having different wavelengths. A part or all of the M optical signals each are performed power splitting to form a first group of optical signals including first split optical signals and a second group of optical signals including second split optical signals. The first group of optical signals and the second group of optical signals both have N different wavelengths.

The first group of optical signals and the second group of optical signals are cross routed to form N carrier groups of signals that need to be provided to N ONUs. The N carrier groups of signals include K carriers. Each carrier group of signals includes a carrier in the first group of optical signals and a carrier in the second group of optical signals, with the carriers having different wavelengths.

To realize the second objective of the present invention, an embodiment of the present invention provides an OLT, which includes a light source module configured to generate M different wavelengths. M light sources at the OLT provide K carriers for N ONUs. M, N, and K each are integers greater than 1, and K>M>=N. The OLT further includes a processing module, a wavelength division multiplexing (WDM) module, and a receiving module.

The processing module is configured to perform power splitting on a part or all of a group of optical signals which have different wavelengths and are generated by the light source module, so as to form a first group of optical signals with first split optical signals and a second group of optical signals with second split optical signals, and modulate downstream data to the first group of optical signals. The first group of optical signals and the second group of optical signals both have N different wavelengths. The second group of optical signals is used as upstream carriers.

The WDM module is configured to perform wavelength division multiplexing on the optical signals modulated with the downstream data and the second group of optical signals to form two paths of mixed optical signals. One path of mixed optical signals include the first group of optical signals modulated with the downstream data and the other path of mixed optical signals includes the second group of optical signals used as the upstream carriers.

The receiving module is configured to receive upstream optical signals of N ONUs. The carrier of the upstream optical signal of each ONU and the downstream carrier sent to the each ONU have different wavelengths.

To realize the third objective of the present invention, the present invention provides an RN unit, which includes a cross routing module.

The cross routing module is configured to perform cross routing on input multiple paths of mixed optical signals, so as to construct a plurality of carrier groups of signals having different wavelengths. The plurality of carrier groups of signals is used as carriers for different ONUs.

Each of the multiple paths of mixed optical signals includes multiple carriers having different wavelengths, and the multiple paths of mixed optical signals have one or more carriers having the same wavelength.

To realize the fourth objective of the present invention, the present invention provides an optical transmission system, which includes OLTs, an RN unit, and N ONUs. The OLTs are connected in sequence and capable of generating M optical signals having different wavelengths and providing K carriers for the N ONUs. M, N, and K are integers greater than 1, and K>M>=N.

The OLTs are configured to generate a group of light sources having M different wavelengths; separately perform power splitting on a part or all of light sources, so as to generate a first group of optical signals including first split optical signals and a second group of optical signals including second split optical signals; modulate downstream data in the first group of optical signals; and perform wavelength division multiplexing on the first group of optical signals modulated with the downstream data and the second group of optical signals, so as to form two paths of mixed optical signals. One path includes the first group of optical signals modulated with the downstream data and the other path includes the second group of optical signals.

The RN unit is connected to the OLTs, and configured to perform cross routing on the input two paths of mixed optical signals, so as to construct a plurality of carrier groups of signals having different wavelengths. The plurality of carrier groups of signals is used as carriers for different ONUs. Each carrier group of signals includes a carrier of a mixed optical signal in the two paths of mixed optical signals, where the mixed optical signal is not modulated with downstream data, and a carrier of a mixed optical signal modulated in the two paths of mixed optical signals, where the mixed optical signal is modulated with downstream data.

In conclusion, the present invention provides an OLT, an RN unit, an optical transmission method and a system, which are capable of reducing the number of light sources on a network. In each technical solution, the generated light sources are used to split optical signals generated by one or a group of light sources into two same paths of optical signals or two groups of optical signals having overlapping wavelengths. Power splitting is performed on one path of mixed optical signals to form two same paths of optical signals. The two paths or two groups of optical signals are used as carriers for different ONUs. Through subsequent cross routing performed on the mixed optical signals formed by two groups of optical signals, the light having the same wavelength and generated by the same light source is used as carriers for different ONUs. In the prior art, a system with N ONUs needs 2N or 3N light sources. Through verification, in each embodiment of the present invention, only about N light sources need to be configured. Therefore, the number of light sources used on the network can be reduced effectively to reduce system costs. Also, the present invention can be implemented with mature and simple devices. The wavelength division multiplexing can be implemented with an arrayed waveguide grating (AWG) in the prior art. The modulation can be implemented with a mature Mach-Zehnder modulator (MZM) or an electro-absorption modulator (EAM). Compared with the second technical solution in the prior art, the present invention can reduce the number of light sources with lower costs. Also, because the upstream and downstream carriers have different wavelengths, transmission quality of signals is greatly improved compared with the first technical solution in the prior art.

The technical solutions of the present invention are further described in detail below with reference to the embodiments and the accompanying drawings.

DETAILED DESCRIPTION OF THE EMBODIMENTS

Figure 1:
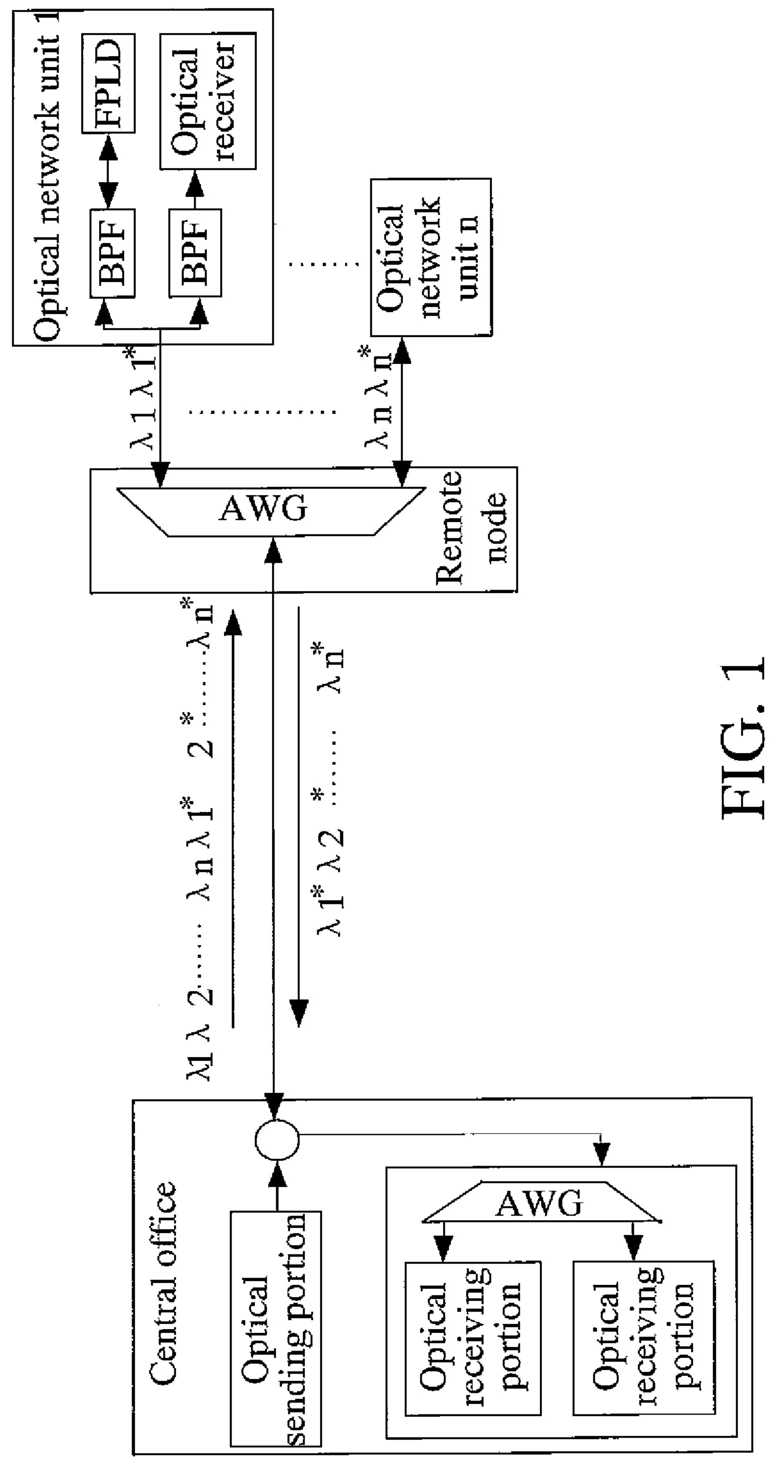
FIG. 1 is a schematic diagram of a wavelength division multiplexing system in the prior art.
Figure 2:
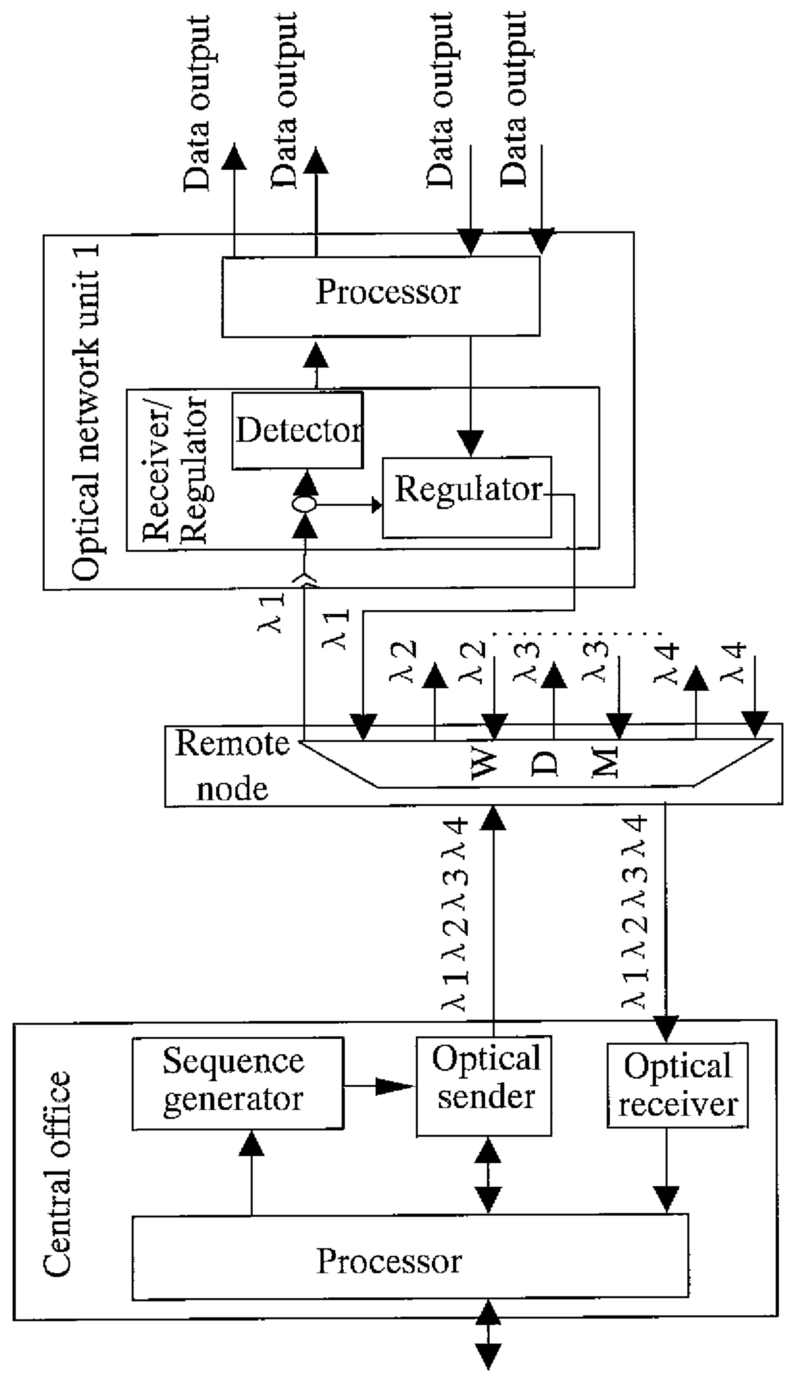
FIG. 2 is a schematic diagram of a PON system based on re-modulation in the prior art.
Figure 3:
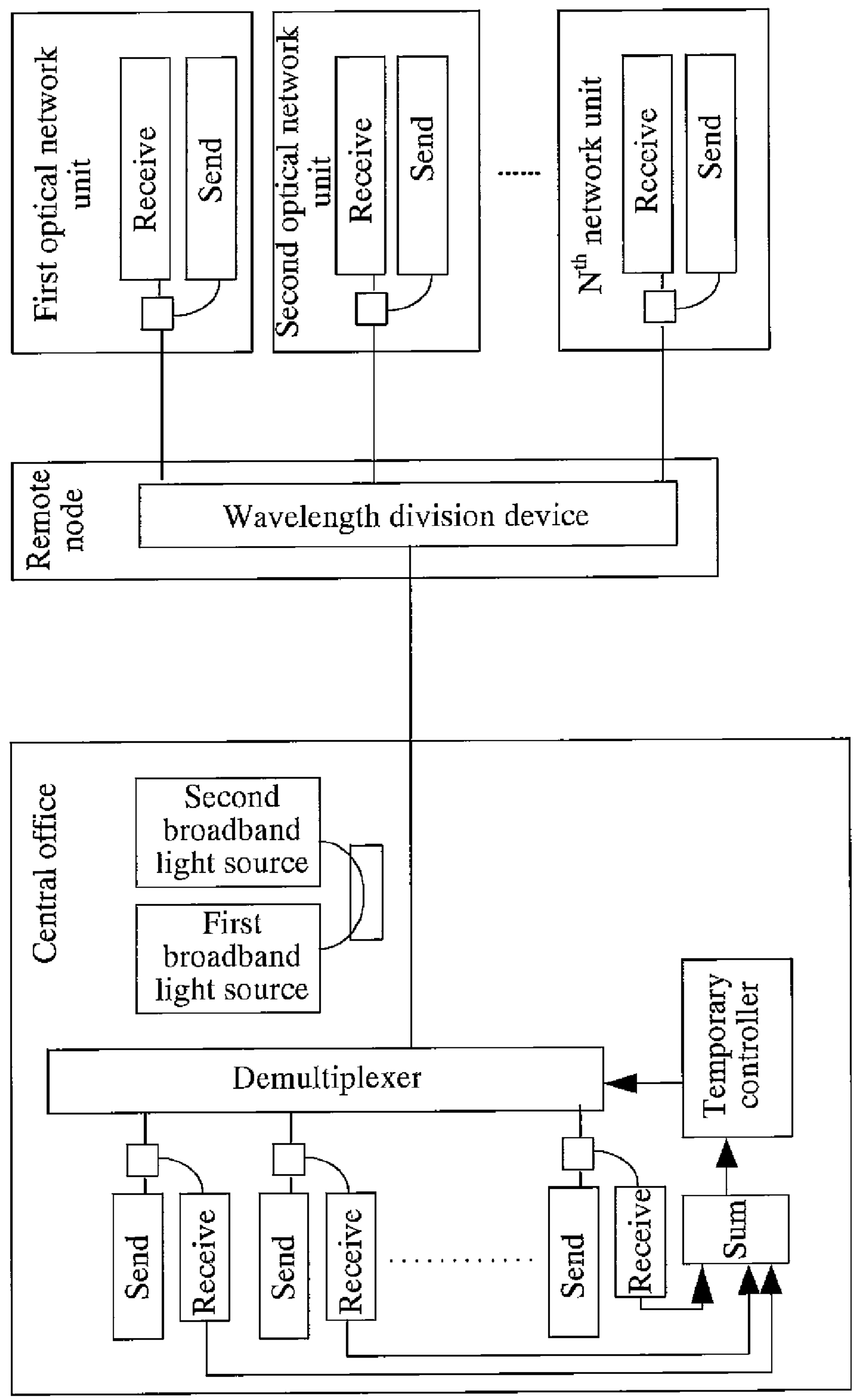
FIG. 3 is a schematic diagram of a PON system based on BLS spectrum splitting in the prior art.
Figure 4:
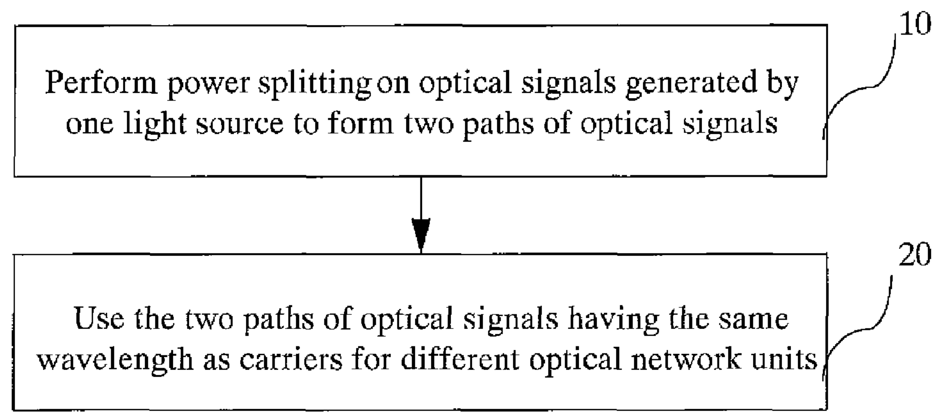
FIG. 4 is a flow chart of a first embodiment of an optical transmission method capable of reducing the number of light sources according to the present invention.

FIG. 4 is a flow chart of a first embodiment of an optical transmission method capable of reducing the number of light sources according to the present invention. As shown in FIG. 4, the optical transmission method according to this embodiment includes the following steps.

In step 10, power splitting is performed on optical signals generated by a light source to form two paths of optical signals.

In step 20, the two paths of optical signals having the same wavelength are used as carriers for different optical network units (ONUs).

Specifically, power splitting is performed on optical signals emitted by the same light source to form two paths of optical signals having the same wavelength, which are used as upstream carriers and downstream carriers for the different ONUs. For example, the power splitting is performed on a light having a wavelength $\lambda_1$, which is generated by a light source, to generate two paths of optical signals each having the wavelength $\lambda_1$. One path of optical signals having the wavelength $\lambda_1$ is used as upstream carriers for a certain ONU. The other path of optical signals having the wavelength $\lambda_1$ is used as downstream carriers for another different ONU. It is different in the prior art that optical signals having a wavelength generated by one light source can only be used once as downstream carriers or upstream carriers for an ONU. In this embodiment, optical signals having a wavelength generated by the same light source are used repetitively, and the light emitted by the same light source is divided into two parts, which are used as carriers for two different ONUs. Therefore, for the two different ONUS, only one light source is used to generate two optical carrier signals, thus reducing the number of light sources effectively.

Figure 5:
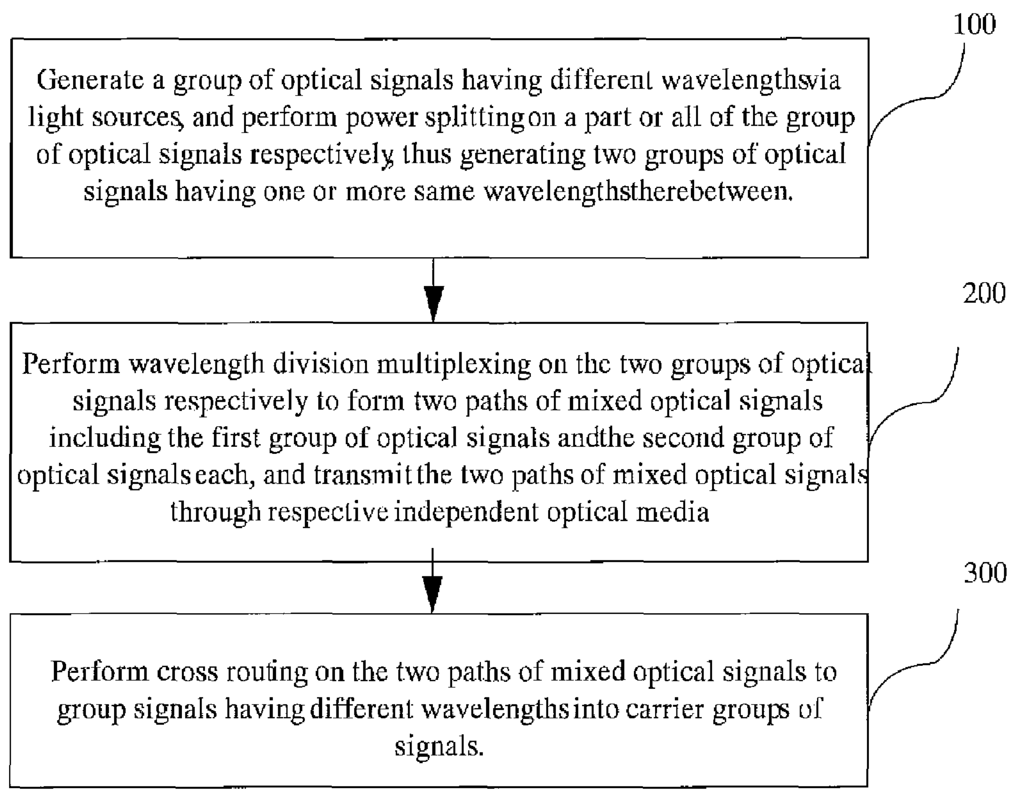
FIG. 5 is a flow chart of a second embodiment of an optical transmission method capable of reducing the number of light sources according to the present invention.

FIG. 5 is a flow chart of a second embodiment of an optical transmission method capable of reducing the number of light sources according to the present invention. As shown in FIG. 5, the optical transmission method according to this embodiment includes the following steps.

In step 100, a group of optical signals having different wavelengths are generated by light sources. A part or all of the generated group of optical signals are separately performed power splitting, to generate two groups of optical signals having one or more same wavelengths therebetween. The generated two groups of optical signals include a first group of optical signals including first split optical signals and a second group of optical signals including second split optical signals.

In step 200, wavelength division multiplexing (WDM) is performed on each of the two groups of optical signals to form two paths of mixed optical signals including the two groups of optical signals, i.e. the first group of optical signals and the second group of optical signals, and the two paths of mixed optical signals are transmitted separately through independent optical media.

In step 300, cross routing is performed on the two paths of mixed optical signals to construct carrier groups of signals having different wavelengths. The carrier groups of signals having different wavelengths are used as carriers for different ONUs.

In this embodiment and the embodiment in FIG. 4, the light generated by light sources is used repetitively. But, in this embodiment, the group of light sources has different wavelengths, and the method in FIG. 4 is performed on one or more light sources in the group of light sources, that is, signals generated by the same light source are performed power splitting to form two paths having the same wavelength therebetween. Thus, one group of optical signals can be separated into two groups of optical signals. In the two groups of optical signals, one or more optical signals have the same wavelength. After the separation into two groups of optical signals, wavelength division multiplexing is separately performed on the two groups of optical signals, so as to form two paths of mixed optical signals. Subsequently, cross routing is performed on the two paths of mixed optical signals. Therefore, two paths of optical signals having the same wavelength generated by one or more light sources in the group of light sources are used as carriers for different ONUs. For ease of understanding of this embodiment, the embodiment in FIG. 12 or 13 can be referred to.

This embodiment is still based on a mode of using wavelengths repetitively. Through the method in this embodiment, for a WDM system with N ONUs, at least only N light sources need to be configured. For example, N light sources are configured and emit consecutive light having wavelengths being $\lambda_1$, $\lambda_2$, . . . , and $\lambda_N$. The light having N wavelengths is used repetitively. The light having N wavelengths is divided into two groups each having N different wavelengths. The first group of optical signals $\lambda_1$, $\lambda_2$, . . . , and $\lambda_N$ is used as downstream carriers for carrying downstream data, and each downstream carrier corresponds to one ONU. The second group of optical signals $\lambda_1$, $\lambda_2$, . . . , and $\lambda_N$ is used as upstream carriers for carrying upstream data, and each upstream carrier corresponds to one ONU. Subsequently, cross routing is performed on two groups of optical signals after wavelength division multiplexing, so that the upstream carriers and downstream carriers output to each ONU are different. For example, the $\lambda_1$ of the first group of optical signals and the $\lambda_2$ of the second group of optical signals are used as downstream and upstream carriers for an ONU1 respectively. The $\lambda_2$ of the first group of optical signals and the $\lambda_3$ of the second group of optical signals are used as downstream and upstream carriers for an ONU2 respectively. In this manner, the $\lambda_N$ of the first group of optical signals and the $\lambda_1$ of the second group of optical signals are used as downstream and upstream carriers for an ONUN respectively. Therefore, light having the same wavelength generated by the same light source is used as upstream and downstream data carriers for different ONUs. The group of N light sources are used to generate carriers of upstream and downstream data for N different ONUs. As shown in the embodiment in FIG. 12, the generated two groups of optical signals are totally the same and N light sources are required in total. In the embodiment in FIG. 13, the two groups of optical signals are not completely the same. As shown in FIG. 13, N+1 light sources need to be used to generate two groups of optical signals each having N wavelengths. The optical signals that have different wavelengths and are generated by the front N light sources are taken as a front group. The optical signals that have different wavelengths and are generated by the tail N light sources are taken as a second group.

As can be seen from the examples, in a WDM system with N ONUs, by adopting this embodiment, when the number of the ONUs is large, that is, the N has a large value, only about N light sources are used. Compared with a conventional WDM passive optical network (PON) system, the number of the light sources is reduced to about half. The number of light sources used in the network can be decreased, so as to reduce costs effectively.

The present invention can be implemented with a mature and simple device. Compared with the second technical solution in the prior art, the present invention can reduce the number of light sources at low costs. Also, as the wavelengths of the upstream and downstream carriers are different, transmission quality of signals is greatly increased compared with the first technical solution in the prior art.

Figure 6:
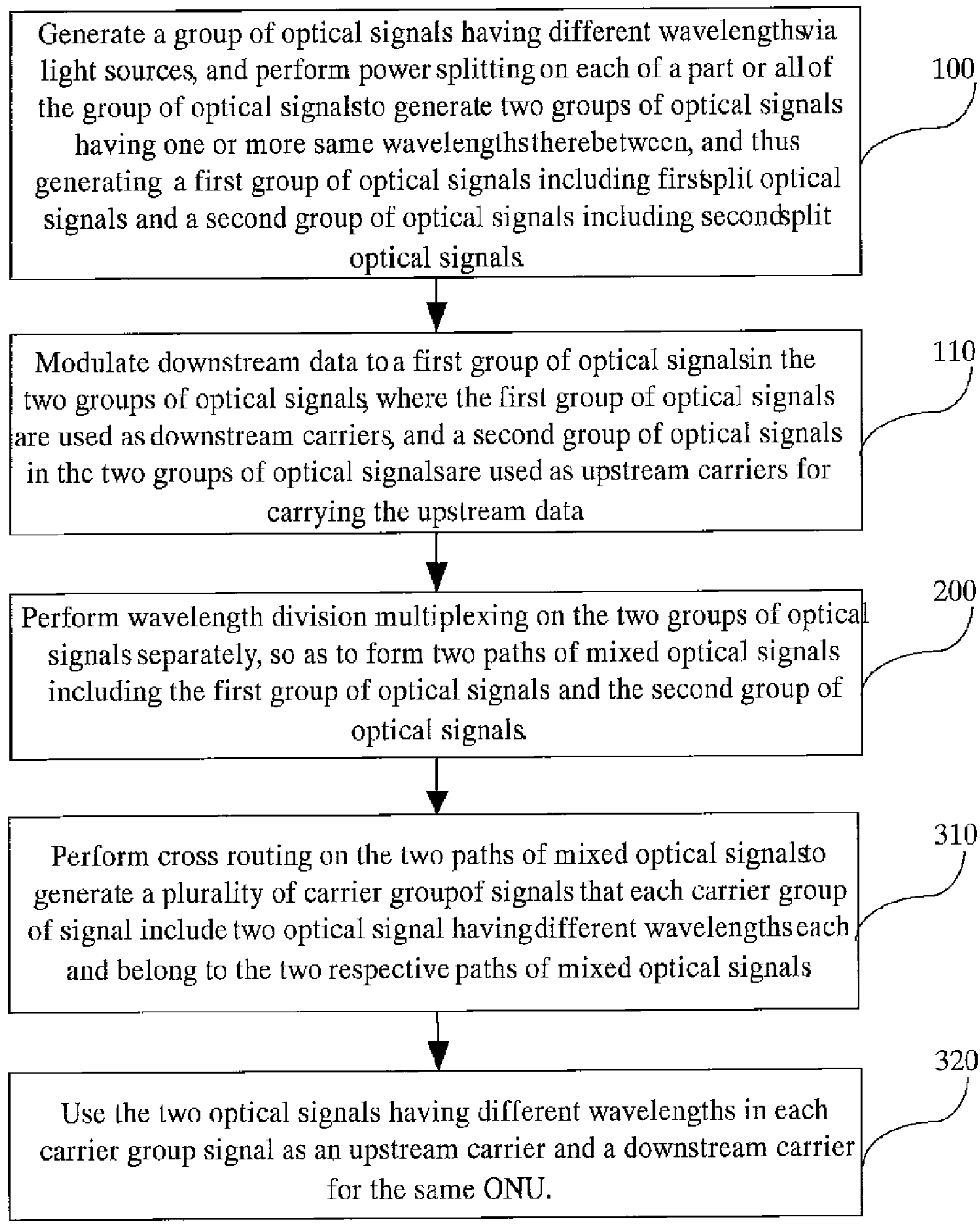
FIG. 6 is a flow chart of a third embodiment of an optical transmission method capable of reducing the number of light sources according to the present invention.

FIG. 6 is a flow chart of a third embodiment of an optical transmission method capable of reducing the number of light sources according to the present invention. Similar to FIG. 5, FIG. 6 has the same functions as those in FIG. 5. However, the process of the wavelength division multiplexing is further specified. The two groups of optical signals are used as upstream carriers and downstream carriers respectively and the downstream data is modulated to the downstream carriers. As shown in FIG. 6, this embodiment includes the following steps.

In step 100, a light source is used to generate a group of optical signals having different wavelengths. A part or all of the generated group of optical signals each are performed power splitting, such that two groups of optical signals having one or more same wavelengths therebetween are generated. The generated two groups of optical signals are a first group of optical signals including first split optical signals and a second group of optical signals including second split optical signals.

In step 110, the first group of optical signals in the two groups of optical signals is used as downstream carriers. The downstream data is modulated to the first group of optical signals. The second group of optical signals in the two groups of optical signals is used as upstream carriers for carrying the upstream data.

In step 200, wavelength division multiplexing is performed on each of the two groups of optical signals, so as to form two paths of mixed optical signals including the first group of optical signals and the second group of optical signals.

In step 310, cross routing is performed on the two paths of mixed optical signals, so as to form a plurality of carrier groups of signals. Each carrier group of signals include two optical signals having different wavelengths. The two optical signals having different wavelengths of each carrier group of signals belong to the two paths of mixed optical signals.

In step 320, the two optical signals having different wavelengths in each carrier group of signals are separately used as an upstream carrier and a downstream carrier for the same ONU.

In this embodiment, the two groups of optical signals are separately used as upstream carriers and downstream carriers and the downstream data is modulated in one group of optical signals. The different ONUs receive their different carrier groups of signals. Each ONU modulates the upstream data on the upstream carrier in its carrier group of signals and sends upstream the upstream data through a reversible path of reception. The process of performing wavelength division multiplexing on the two groups of optical signals can be obtained with reference to embodiments in FIG. 12, FIG. 13, FIG. 15, FIG. 16, and FIG. 20. In this embodiment, cross routing is performed on the two groups of optical signals. As illustrated in the embodiment in FIG. 5, the $\lambda_1$ of the first group of optical signals and the $\lambda_2$ of the second group of optical signals in the two groups of optical signals are used as downstream and upstream carriers for an ONU1 respectively. The $\lambda_2$ of the first group of optical signals and the $\lambda_3$ of the second group of optical signals are used as downstream and upstream carriers for an ONU2 respectively. In this manner, the $\lambda_N$ of the first group of optical signals and the $\lambda_1$ of the second group of optical signals are used as downstream and upstream carriers for an ONUN respectively. At this time, each carrier group of signals may consist of two optical wave signals having their two wavelengths adjacent. Of course, other modes such as cross routing or crossing combination can also be used. For example, the $\lambda_1$ of the first group of optical signals and the $\lambda_3$ of the second group of optical signals are used as the downstream and upstream carriers for the ONU1 respectively. The $\lambda_2$ of the first group of optical signals and the $\lambda_4$ of the second group of optical signals are used as the downstream and upstream carriers for the ONU2 respectively. In this manner, the $\lambda_N$ of the first group of optical signals and the $\lambda_2$ of the second group of optical signals are used as the downstream and upstream carriers for the ONUN respectively. At this time, each carrier group of signals consists of two optical wave signals having their two wavelengths separated by one wavelength therebetween. Persons of ordinary skill in the art should understand that multiple ways can be employed to implement the cross routing, as long as the two optical wave signals forming a group belong to two separate groups of optical signals and have different wavelengths, so as to satisfy the demand for different wavelengths when each crossing combination signal is used as upstream and downstream carriers for the same ONU.

Figure 7:
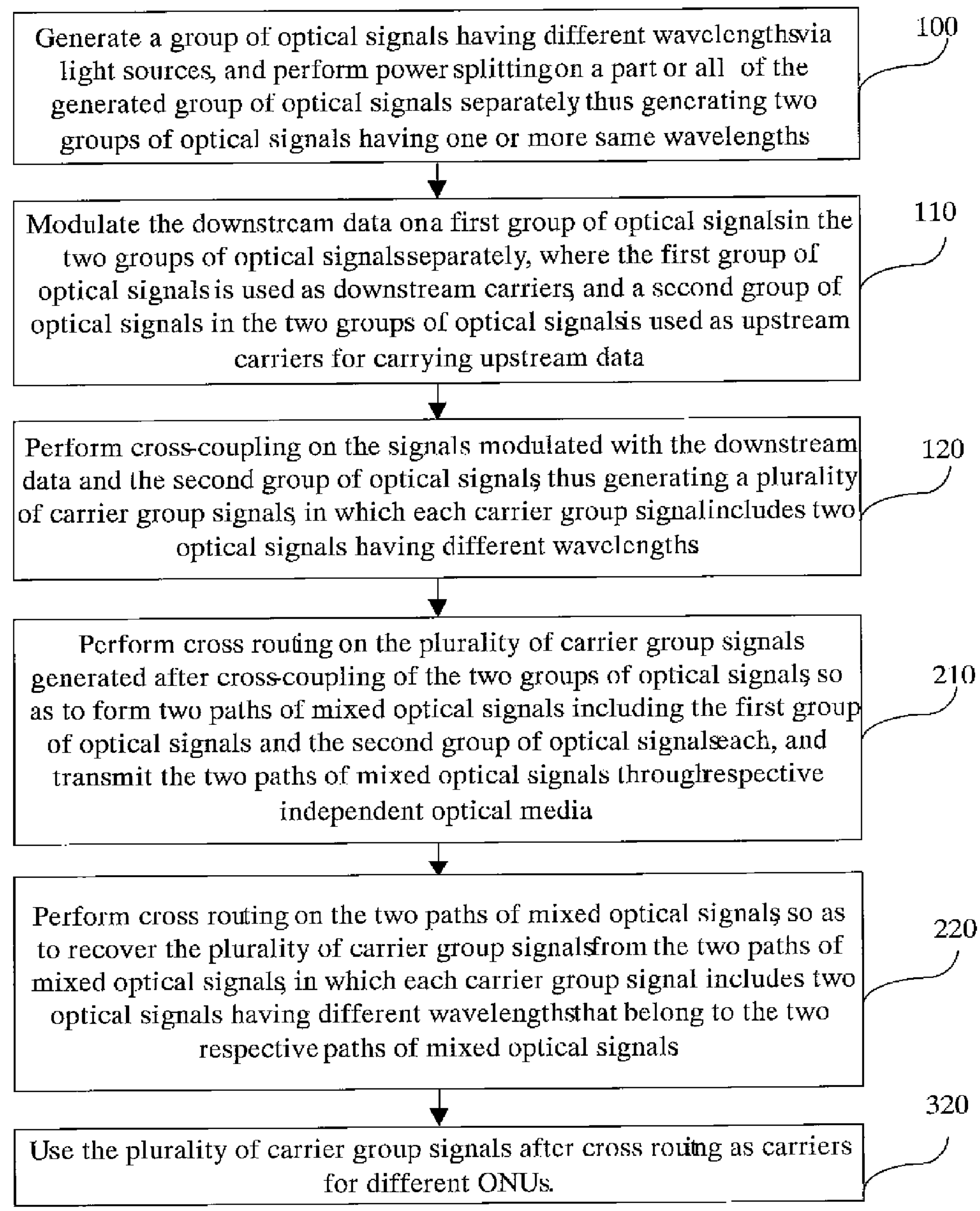
FIG. 7 is a flow chart of a fourth embodiment of an optical transmission method capable of reducing the number of light sources according to the present invention.

FIG. 7 is a flow chart of a fourth embodiment of an optical transmission method capable of reducing the number of light sources according to the present invention. There is some difference between FIG. 7 and FIG. 6. As shown in FIG. 7, the optical transmission method according to this embodiment includes the following steps.

In step 100, a light source is used to generate a group of optical signals having different wavelengths. A part or all of the generated group of optical signals each are performed power splitting into a first split optical and a second split optical, and then two groups of optical signals having one or more same wavelengths therebetween are generated. The generated two groups of optical signals are a first group of optical signals including first split optical signals of the part or all of the generated group of optical signals and a second group of optical signals including second split optical signals.

In step 110, the first group of optical signals in the two groups of optical signals is used as downstream carriers. Downstream data is modulated on the first group of optical signals. The second group of optical signals in the two groups of optical signals is used as upstream carriers for carrying upstream data.

In step 120, cross-coupling is performed on the signals modulated with the downstream data and the second group of optical signals, to generate a plurality of carrier groups of signals. Each carrier group of signals has two optical signals having different wavelengths coupled.

In step 210, cross routing is performed on the plurality of carrier groups of signals generated after cross-coupling of the two groups of optical signals, so as to form two paths of mixed optical signals. The first and second paths of mixed optical signals include the first and second groups of optical signals respectively. The two paths of mixed optical signals are transmitted separately through independent optical media.

In step 220, cross routing is performed on the two paths of mixed optical signals to recover the plurality of carrier groups of signals therefrom. Each carrier group of signals includes two optical signals having different wavelengths. The two optical signals having different wavelengths included in each carrier group of signals belong to their two paths of mixed optical signals.

In step 320, the plurality of carrier groups of signals after cross routing are used as carriers for different ONUs.

Figure 14:
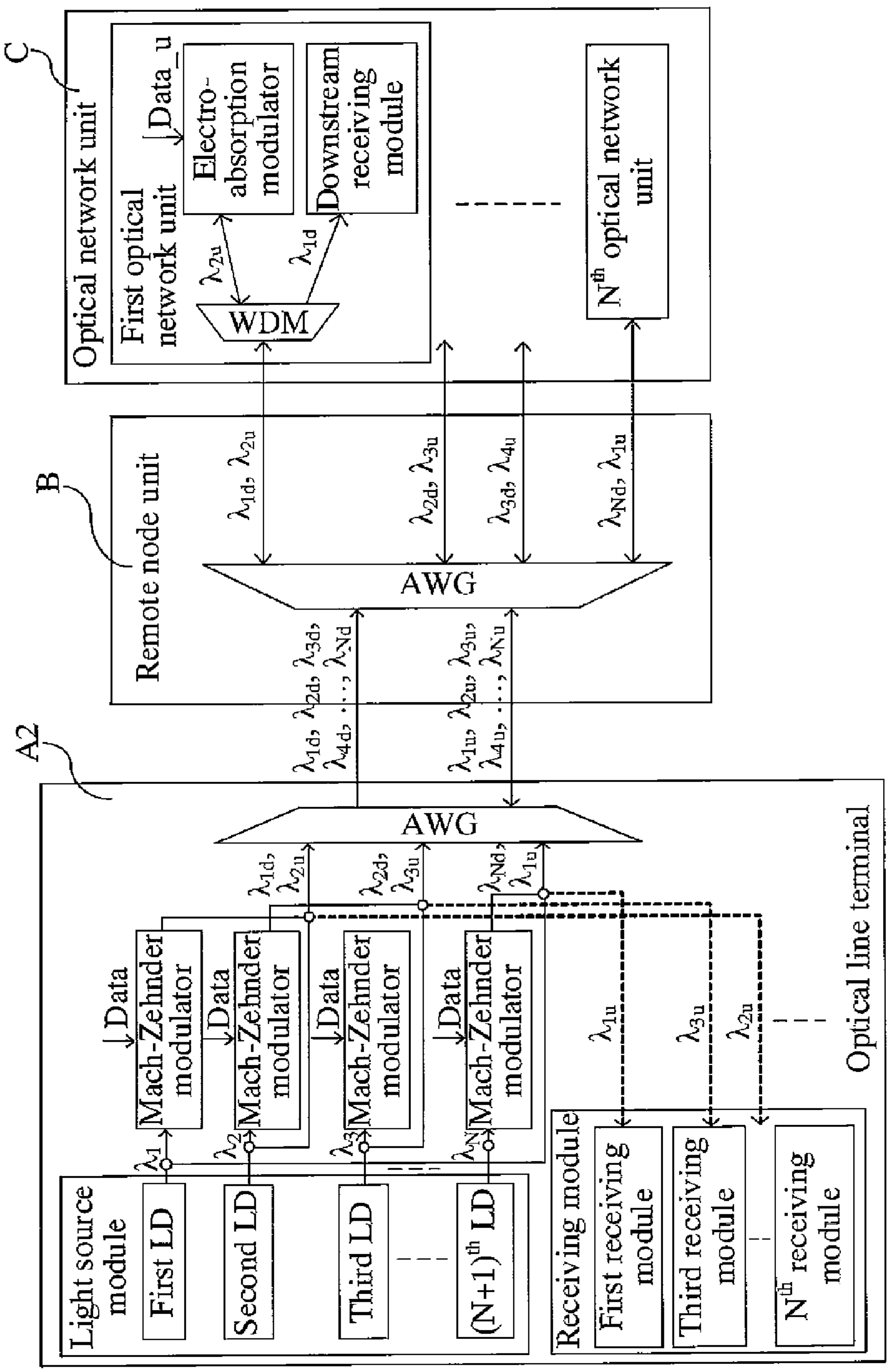
FIG. 14 is a schematic diagram of a third embodiment of an optical transmission system capable of reducing the number of light sources according to the present invention.
Figure 18A:
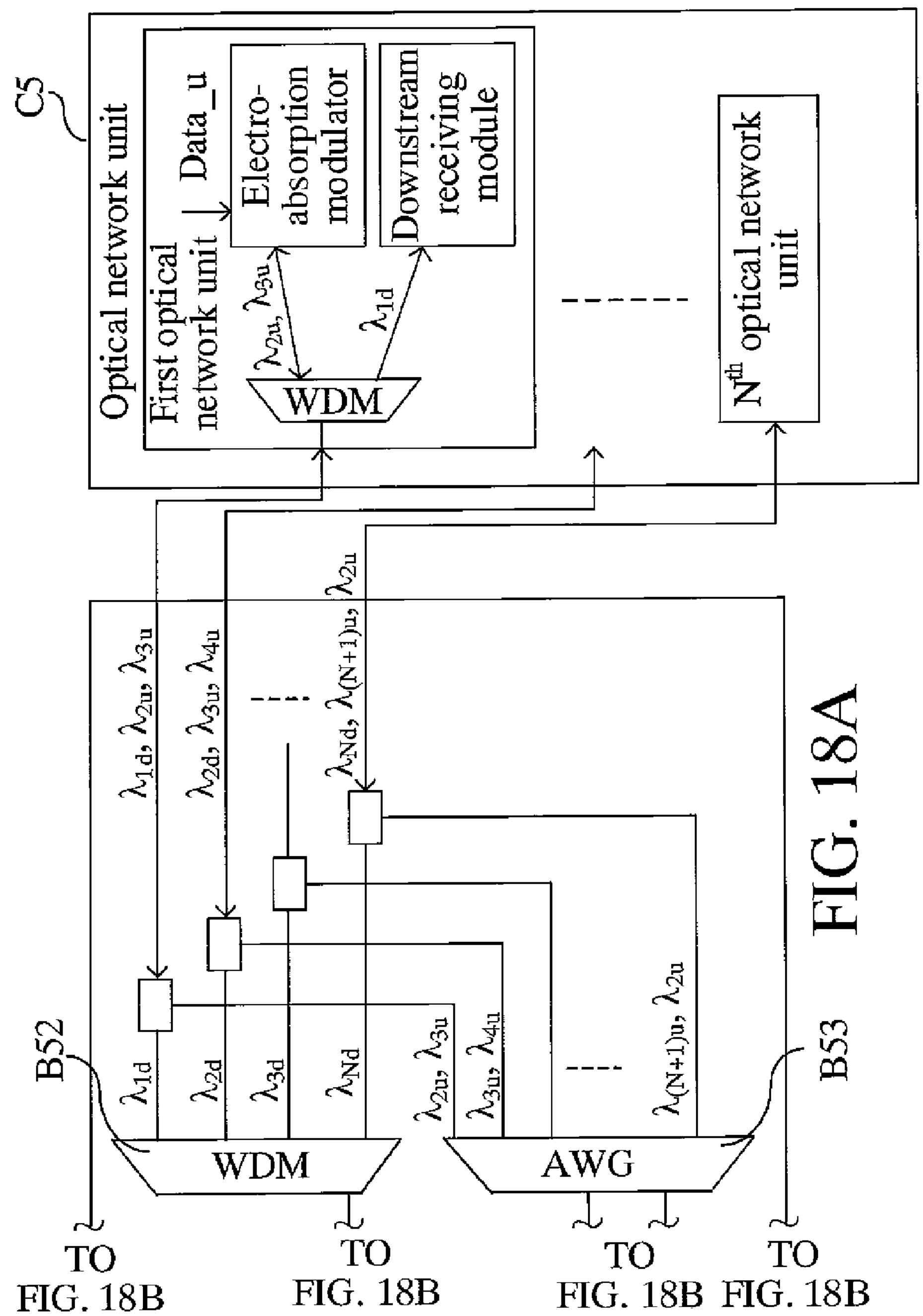
FIG. 18 is a schematic diagram of a seventh embodiment of an optical transmission system capable of reducing the number of light sources and a fifth embodiment of an RN unit according to the present invention.
Figure 18B:
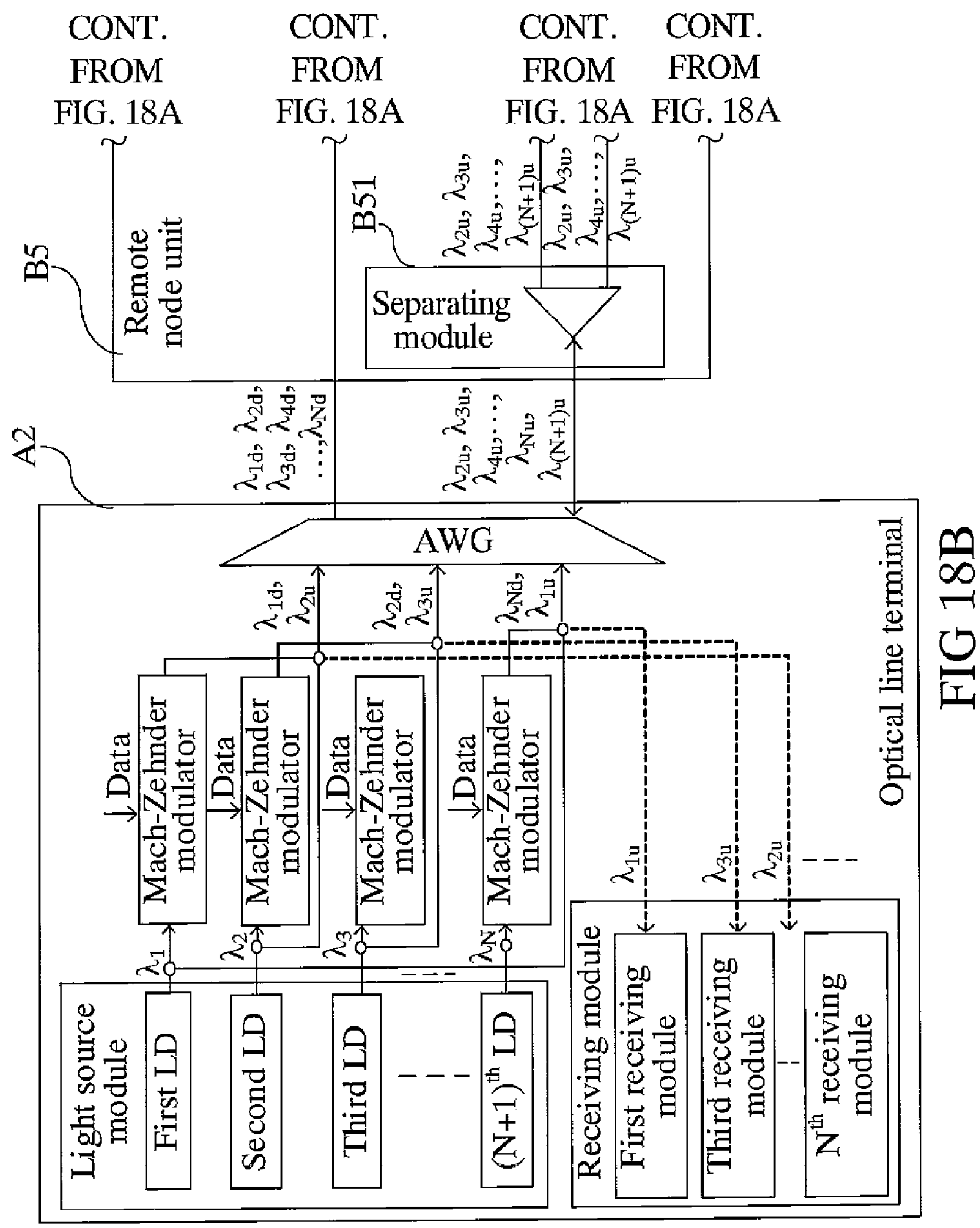

The process of performing cross-coupling and wavelength division multiplexing on the two groups of optical signals can be obtained with reference to an internal structure of an optical line terminal (OLT) in the embodiment in FIG. 14 or 18.

Referring to embodiments shown in FIG. 6 together with FIG. 7, the wavelength division multiplexing of the two groups of optical signals includes multiple modes.

1) Wavelength division multiplexing is directly performed on the first and second group of optical signals separately. For example, the N optical signal within the first group as N inputs of a WDM device (for example, an AWG) are wavelength division multiplexed into one path of mixed optical signal. The N optical signals within the second group as N inputs of another wavelength division multiplexing device are wavelength division multiplexed into one path of mixed optical signal. Therefore, two paths of mixed optical signals after wavelength division multiplexing are formed.

2) The first group of optical signals and the second group of optical signals are first cross-coupled to generate carrier groups of signals. Each carrier group of signals includes a signal having a certain wavelength in the first group of optical signals and a signal as an upstream carrier in the second group of optical signals, where the signal as the upstream carrier has a different wavelength from the signal having the certain wavelength in the first group of optical signals. For example, the $\lambda_1$ of the first group of optical signals and the $\lambda_3$ of the second group of optical signals are cross-coupled into a first carrier group of signals. The $\lambda_2$ of the first group of optical signals and the $\lambda_4$ of the second group of optical signals are cross-coupled into a second carrier group of signals. In this manner, the $\lambda_N$ of the first group of optical signals and the $\lambda_2$ of the second group of optical signals are cross-coupled into an $N^{th}$ carrier group of signals. Subsequently, the carrier groups of signals are cross routed through a wavelength division multiplexing device, for example, a 2×N port AWG device, to output two paths of mixed optical signals undergoing wavelength division multiplexing, and the details may be obtained with reference to the embodiment shown in FIG. 14.

In this embodiment, before performing wavelength division multiplexing on the two groups of optical signals, a cross-coupling step is further added. A 2×N coupling device can be used for cross-coupling, so as to further reduce the number of wavelength division multiplexing devices, thus reducing costs.

In the embodiments, two groups of optical signals having one or more same wavelengths are generated by using a group of optical signals having different wavelengths, which are generated by a plurality of light sources. The detailed process can be as follows. N light sources are provided for generating optical signals having different wavelengths. An optical signal generated by each light source is performed power splitting into two paths of split optical signals. One path of split optical signal is used as a downstream carrier for carrying downstream data. The other path of split optical signal is used as an upstream carrier for carrying upstream data. N optical signals as downstream carriers, which are obtained by performing power splitting on the optical signals generated by the N light sources, are grouped into a first group of optical signals. The N optical signals as upstream carriers, which are obtained by perform power splitting on the optical signals generated by the N light sources, are grouped into a second group of optical signals. The details may be obtained with reference to FIG. 10, 11, 12 or 14. At this time, a remote node (RN) subsequently receives two paths of mixed optical signals that undergo wavelength division multiplexing, performs cross routing on the two paths of mixed optical signals, so as to form carrier groups of signals. Each carrier group of signals may consist of two optical signals belonging to the two paths of mixed optical signals. The two optical signals in each carrier group of signals have different wavelengths. That is, if the optical signals belong to the two paths of mixed optical signals each and the optical signals have different wavelengths, the optical signals can be combined into one group. The wavelengths of the two optical signals may be adjacent or separated by at least one wavelength therebetween, the description of which is omitted here.

In the above embodiments, two groups of optical signals having one or more same wavelengths are generated by using a group of optical signals having different wavelengths, which are generated by a plurality of light sources. The detailed process can be as follows. N+1 light sources are provided for generating optical signals having different wavelengths. The optical signal generated by each of the N−1 light sources located in the middle of the N+1 light sources is performed power splitting into two paths, such that 2N−2 paths of optical signals are generated. The optical signal which is generated by the first light source of the N+1 light sources and the N−1 paths of optical signals which are generated by perform power splitting on the N−1 light sources located in the middle are grouped into a first group of optical signals. The N−1 paths of optical signals which are generated by perform power splitting on the N−1 light sources located in the middle of the N+1 light sources and the optical signal which is generated by the N+1$^{th}$ light source are grouped into a second group of optical signals, and details may be obtained with reference to FIG. 13. Such a grouping mode mainly considers that in practical design, during cross routing of the RNs, it is very difficult to realize optical wavelength combination and output by performing cross routing on the $\lambda_N$ of the first group of optical signals and the $\lambda_1$ of the second group of optical signals. Therefore, the (N+1)$^{th}$ light source is added, so that the signal of the N$^{th}$ light source carrying downstream data and the upstream carrier signal of the (N+1)$^{th}$ light source are constructed into an N$^{th}$ carrier group of signals, thus reducing design complexity.

Figure 8:
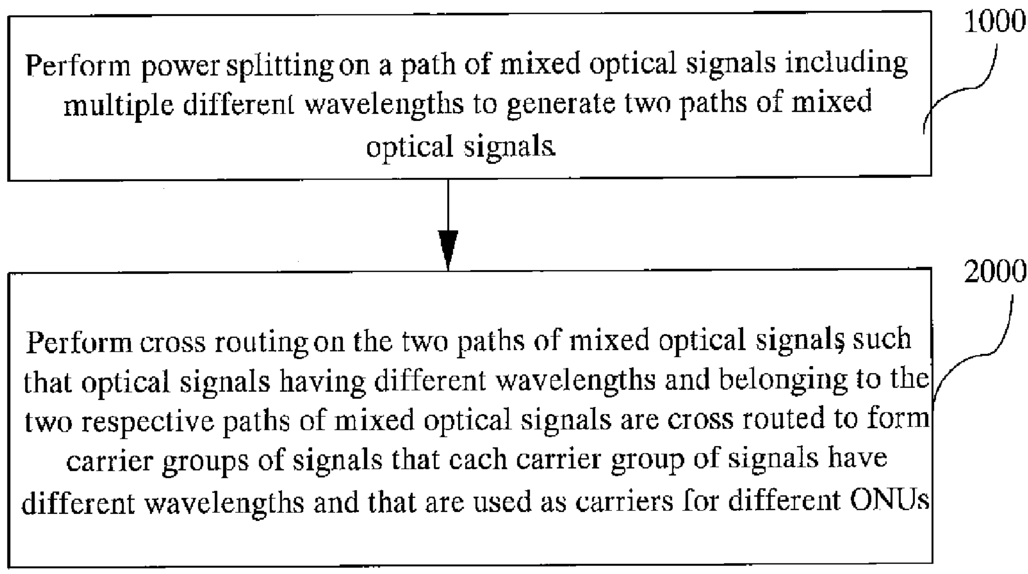
FIG. 8 is a flow chart of a fifth embodiment of an optical transmission method capable of reducing the number of light sources according to the present invention.

FIG. 8 is a flow chart of a fifth embodiment of an optical transmission method capable of reducing the number of light sources according to the present invention. As shown in FIG. 8, the optical transmission method according to this embodiment includes the following steps.

In step 1000, power splitting is performed on a path of mixed optical signals having multiple different wavelengths to generate two paths of mixed optical signals having the same wavelength as the path of mixed optical signal.

In step 2000, cross routing is performed on the two paths of mixed optical signals, such that optical signals having different wavelengths and belonging to the two paths of mixed optical signals are cross routed to form carrier groups of signals that each carrier group of signals have different wavelengths and that are used as carriers for different ONUs.

Figure 16:
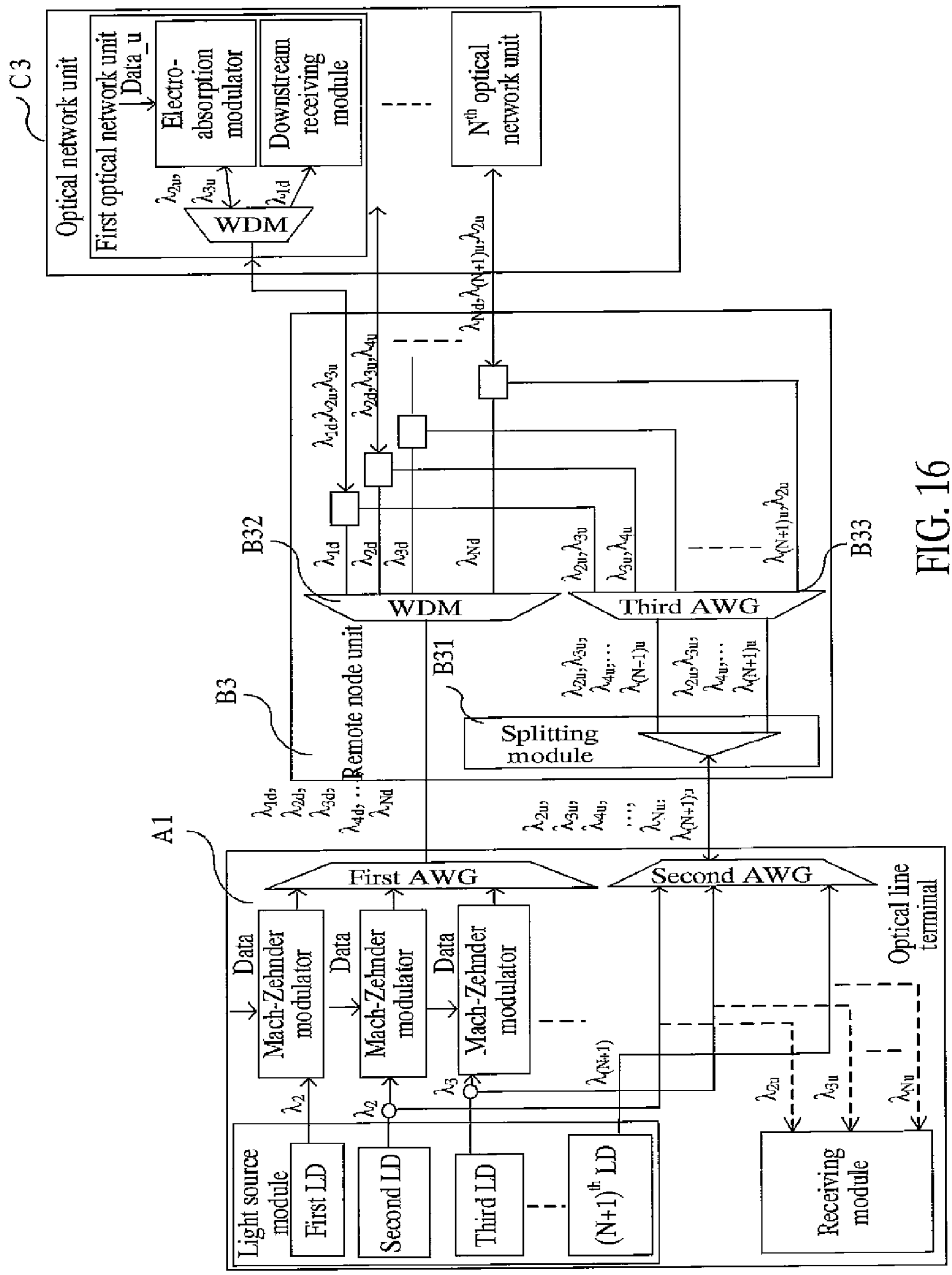
FIG. 16 is a schematic diagram of a fifth embodiment of an optical transmission system capable of reducing the number of light sources and a fourth embodiment of an RN unit according to the present invention.
Figure 17A:
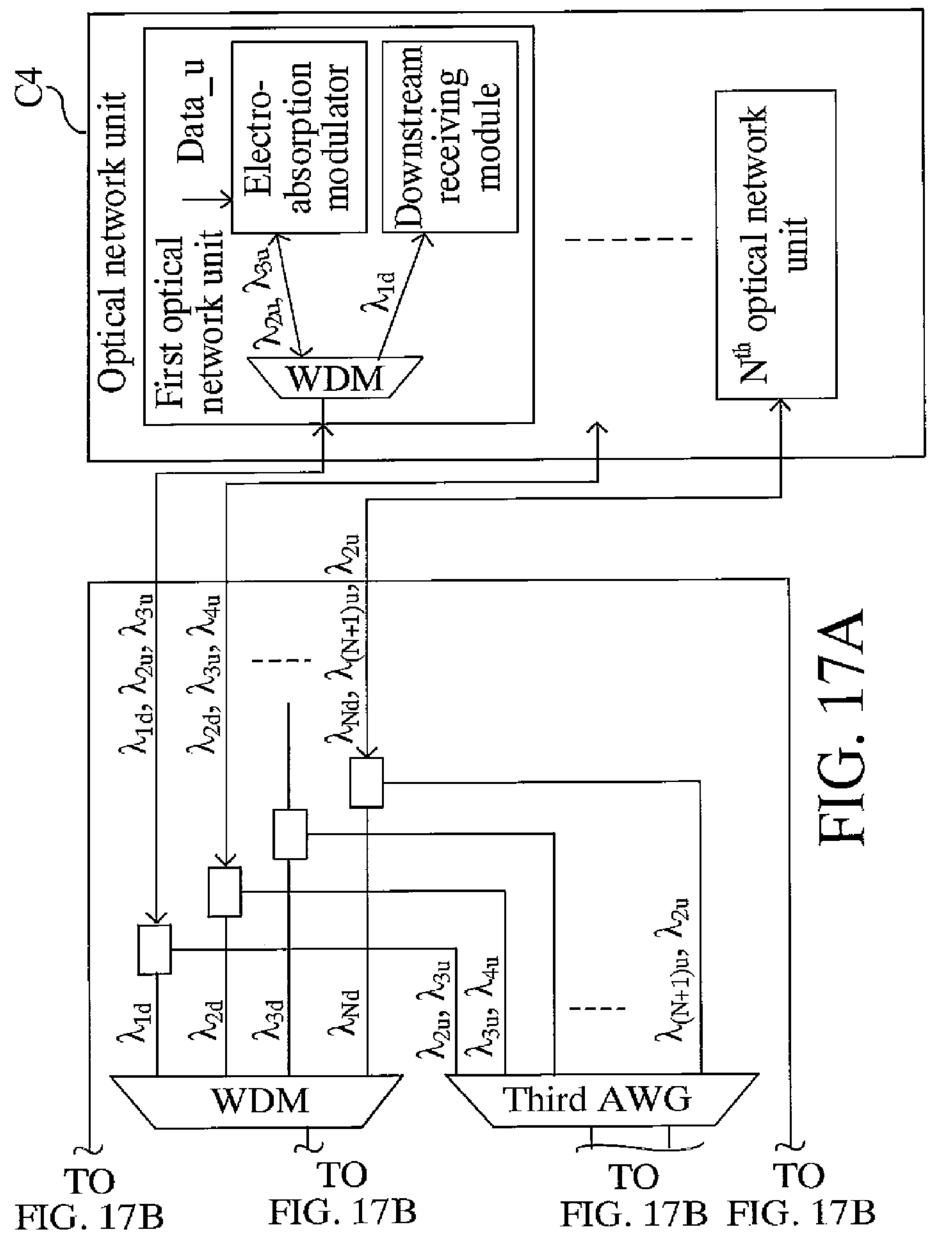
FIG. 17 is a schematic diagram of a sixth embodiment of an optical transmission system capable of reducing the number of light sources according to the present invention.
Figure 17B:
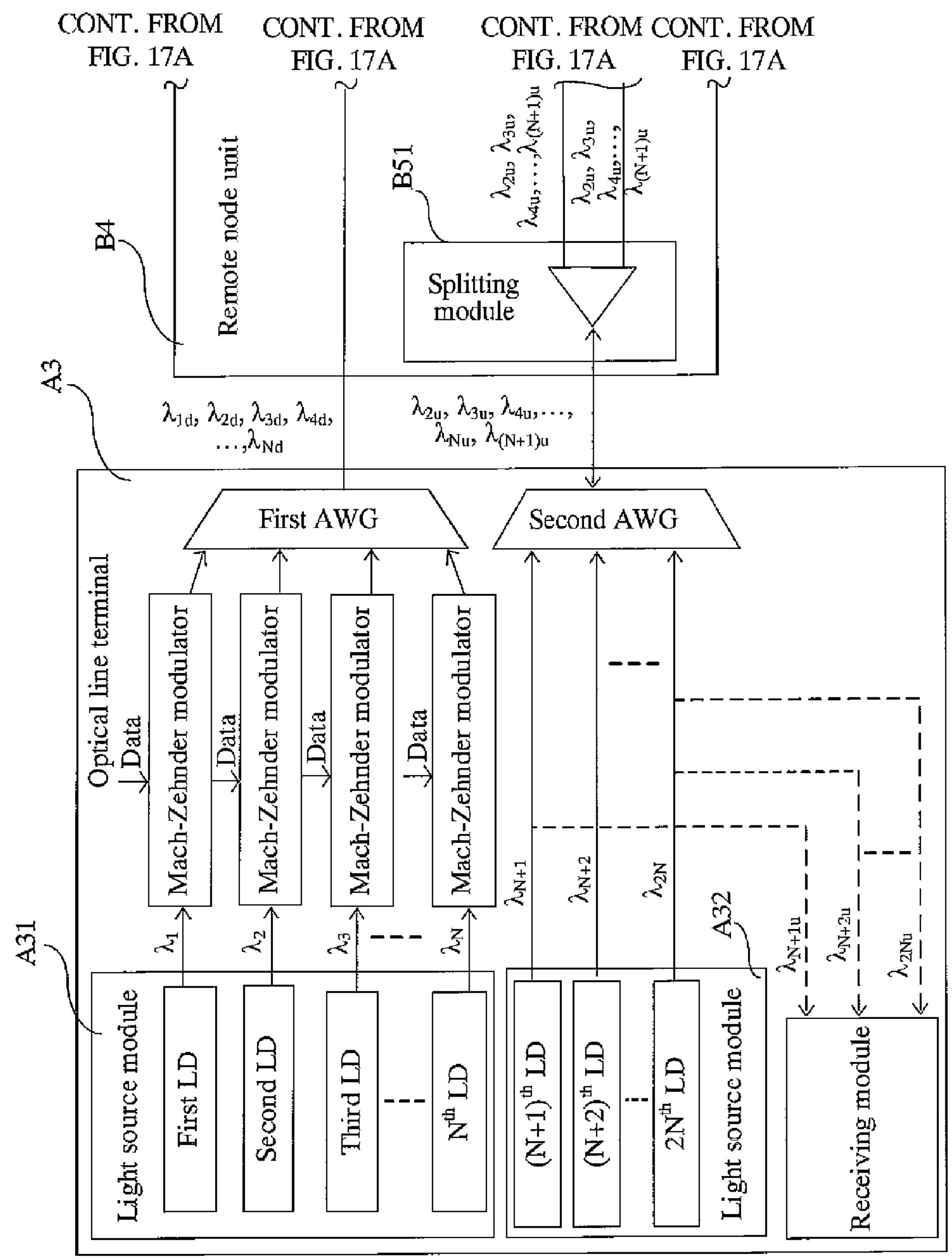

This embodiment can be understood with reference to structural views of embodiments in FIGS. 16 to 18. As in the embodiment in FIG. 16, an RN unit splits a path of mixed optical signals having different wavelengths $\lambda_{2u}$, $\lambda_{3u}$, . . . , $\lambda_{(N+1)u}$ into two paths. Subsequently the two paths of optical signals are cross routed, so as to form several carrier groups of signals. The several carrier groups of signals are used as upstream carriers for different ONUs. In this embodiment, two upstream carriers are delivered for each ONU, so as to obtain high power of upstream modulation signals. Together with the downstream carrier, each ONU occupies 3 carrier signals. In the prior art, if each ONU occupies three carrier signals and N ONUs exist in total, 3N light sources are needed. Through the method in this embodiment, one path of mixed optical signals is divided into two paths of mixed optical signals. The two paths of mixed optical signals are cross routed to form upstream carriers for different ONUs. Therefore, the system needs N light sources only at the lower limit, as shown in the embodiment in FIG. 18, and the number of the light sources does not exceed 2N at most, as shown in the embodiment in FIG. 17.

Figure 9:
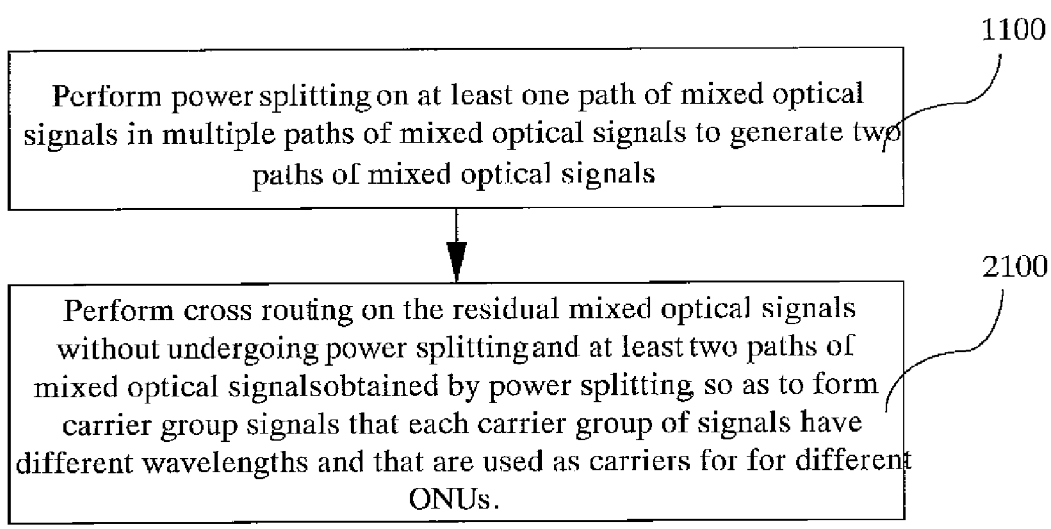
FIG. 9 is a flow chart of a sixth embodiment of an optical transmission method capable of reducing the number of light sources according to the present invention.

FIG. 9 is a flow chart of a sixth embodiment of an optical transmission method capable of reducing the number of light sources according to the present invention. As shown in FIG. 9, the optical transmission method according to this embodiment includes the following steps.

In step 1100, power splitting is performed on at least one path of mixed optical signals in the multiple paths of mixed optical signals to generate two paths of mixed optical signals. Each path of mixed optical signals in the multiple paths of mixed optical signals have a plurality of different wavelengths.

In step 2100, cross routing is performed on the residual mixed optical signals without undergoing power splitting in the multiple paths of mixed optical signals and the two paths or multiple paths of mixed optical signals after undergoing power splitting, so as to form carrier groups of signals that each carrier group of signals have different wavelengths and that are used as carriers for different ONUs.

Figure 19:
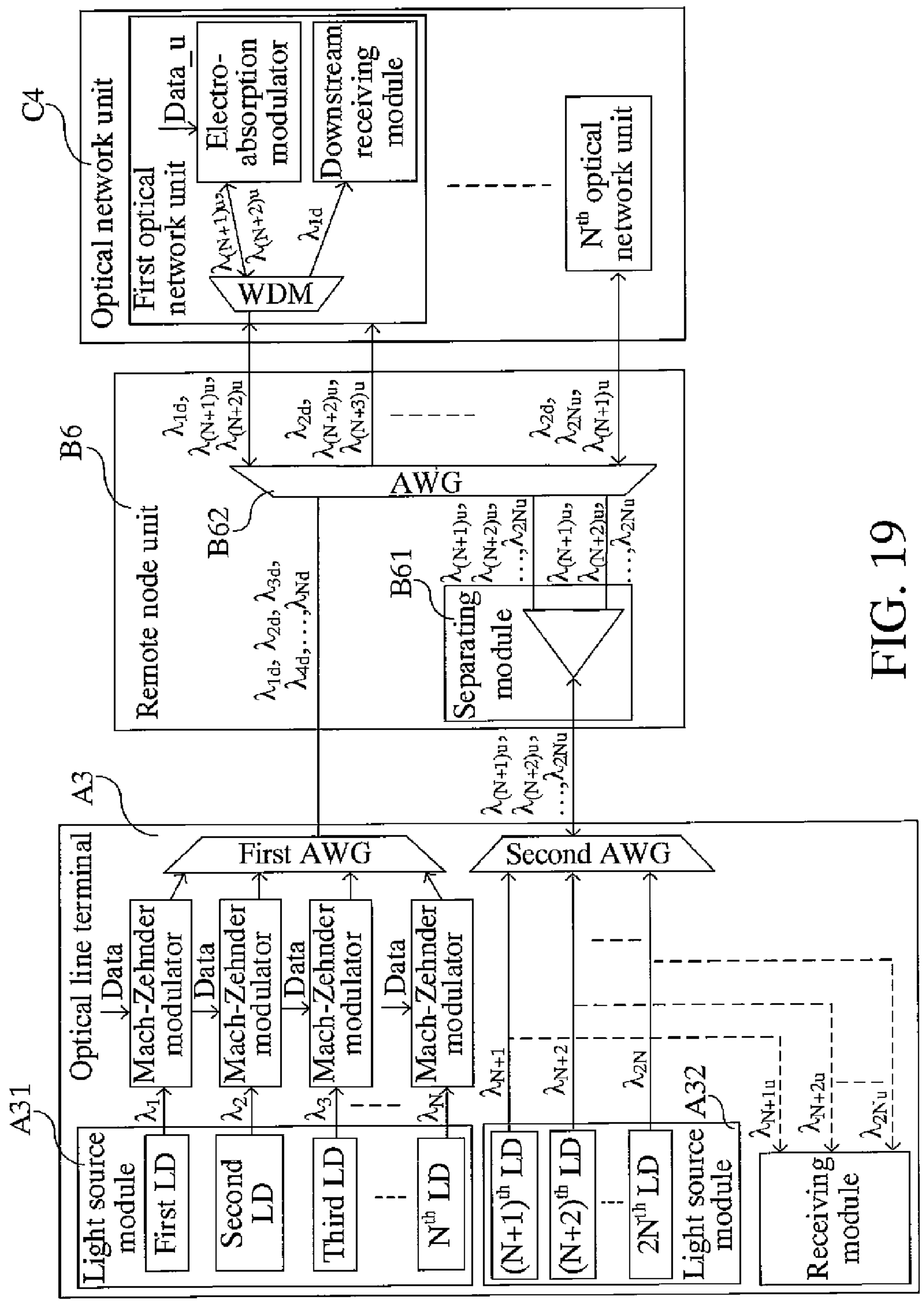
FIG. 19 is a schematic diagram of an eighth embodiment of an optical transmission system capable of reducing the number of light sources and a sixth embodiment of an RN unit according to the present invention.
Figure 20:
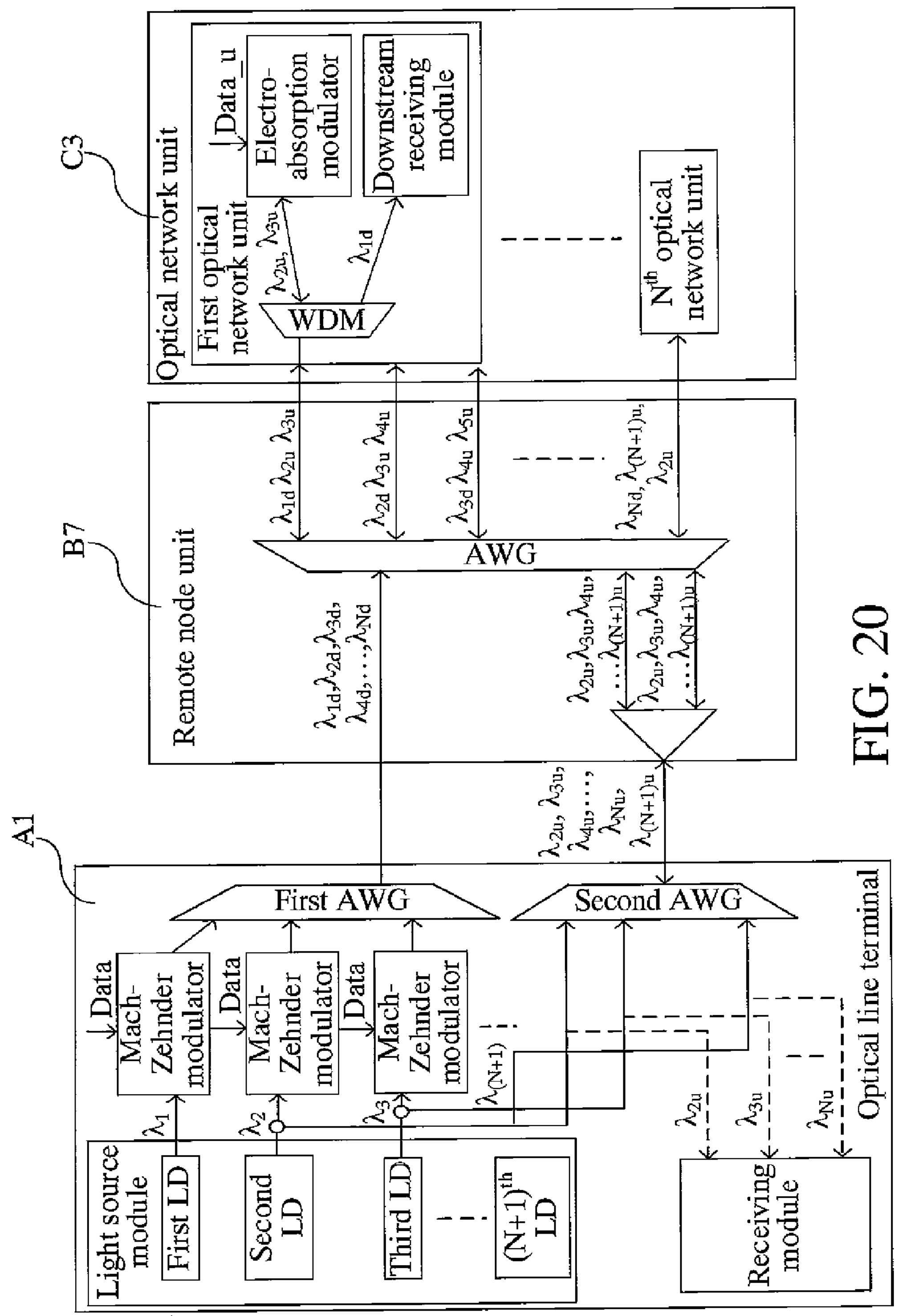
FIG. 20 is a schematic diagram of a ninth embodiment of an optical transmission system capable of reducing the number of light sources and a seventh embodiment of an RN unit according to the present invention.

This embodiment is similar to the embodiment in FIG. 8. But, in FIG. 8 one path of mixed optical signals is used, and in FIG. 9 multiple paths of mixed optical signals are used, and one path of mixed optical signals thereof is separated through the method in FIG. 8. In FIG. 8, cross routing is performed on two separated paths of mixed optical signals. In this embodiment, cross routing is performed on mixed optical signals after undergoing power splitting and residual optical signals without undergoing power splitting, and details may be obtained with reference to an internal structure of RN units in the embodiments in FIG. 19 to FIG. 20. The multiple paths of mixed optical signals may have the same wavelength. In the embodiment in FIG. 20, in the two paths of mixed optical signals, wavelengths of the first path of mixed optical signals are $\lambda_2$, $\lambda_3$, . . . , $\lambda_{(N+1)}$. Wavelengths of the second path of mixed optical signals are $\lambda_1$, $\lambda_2$, . . . , $\lambda_{(N+1)}$. The subscript "d" in FIG. 20 denotes a downstream carrier and the subscript "u" denotes an upstream carrier. As can be seen from FIG. 20, the two paths of mixed optical signals have N−1 same wavelengths therebetween. As shown in FIG. 19, in two paths of mixed optical signals, wavelengths of the first path of mixed optical signals are $\lambda_1$, $\lambda_2$, . . . , and $\lambda_N$. The wavelengths of the second path of mixed optical signals are $\lambda_{N+1}$, $\lambda_{N+2}$, . . . , $\lambda_{2N}$. The subscript "d" in FIG. 19 denotes a downstream carrier and the subscript "u" denotes an upstream carrier. As shown in FIG. 20, wavelengths of the two paths of mixed optical signals are different, the description of which is omitted here.

Figure 10:
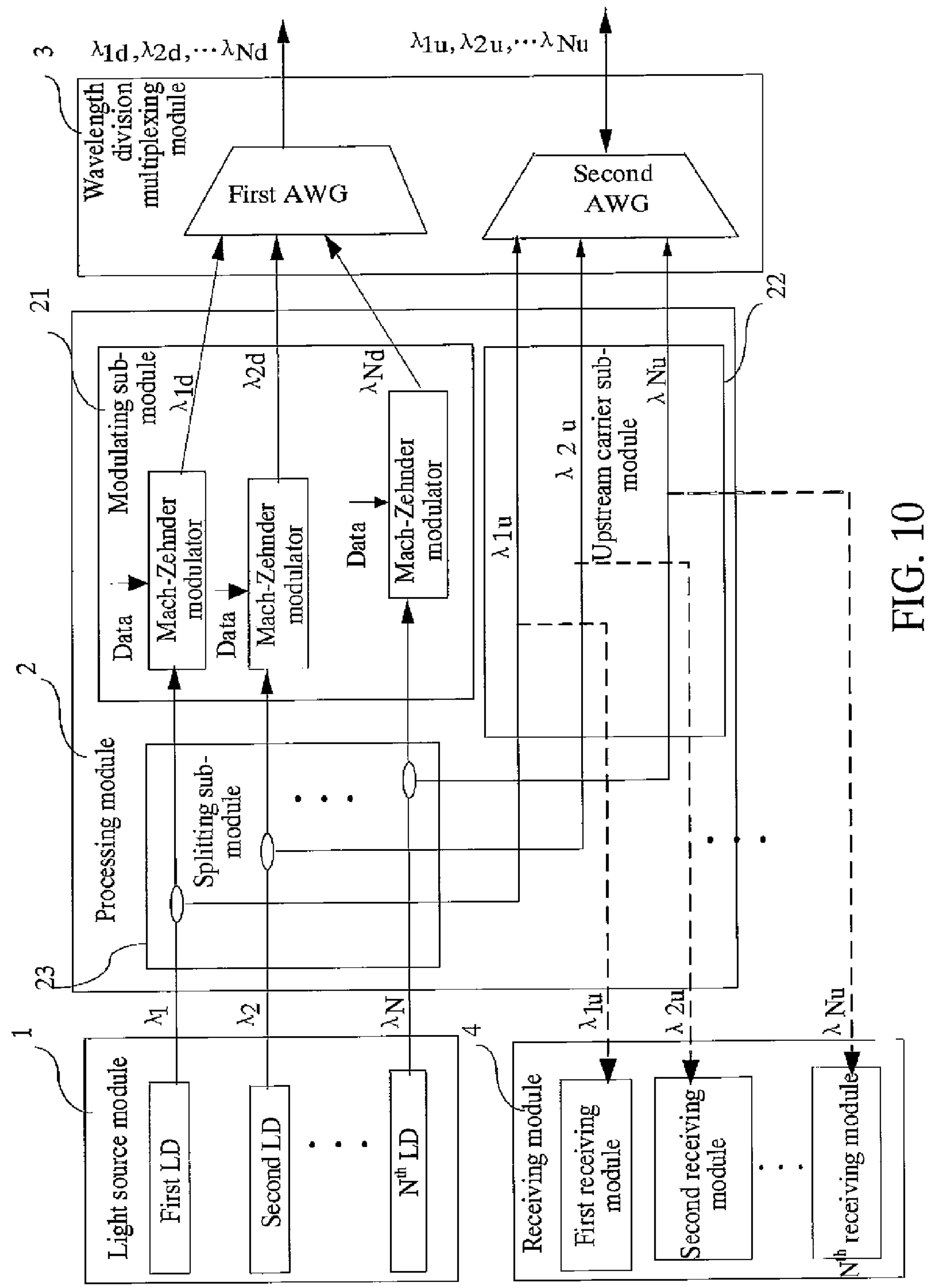
FIG. 10 is a schematic diagram of a first embodiment of an OLT according to the present invention.

FIG. 10 is a schematic diagram of a first embodiment of an OLT according to the present invention. As shown in FIG. 10, the OLT in this embodiment includes a light source module 1 for generating N optical signals having different wavelengths. For example, the light source module 1 includes N laser diodes (LDs) configured to generate N optical signals having different wavelengths. The LDs are represented as a first LD, a second LD, . . . , and $N^{th}$ LD, and the generated N optical signals having different wavelengths are marked as $\lambda_1$, $\lambda_2$, . . . , and $\lambda_N$. A receiving module 4 in FIG. 10 can use a photo diode (PD) to receive optical signals having different wavelengths, and further examples are omitted. In addition, as downstream carriers and upstream carriers included in carrier groups of signals of each ONU have different wavelengths, upstream carriers sent by an ONU and received by the receiving module 4 and downstream carriers sent to the ONU have different wavelengths, thus realizing reuse of wavelengths without influencing the upstream and downstream. In this embodiment, the OLT further includes a processing module 2 and a wavelength division multiplexing module 3.

The processing module 2 is connected to the light source module 1, and configured to employ a group of optical signals that have different wavelengths and are generated by the light source module 1. The processing module 2 may be configured to perform power splitting on a part or all of the group of optical signals each, and form a first group of optical signals including first split optical signals (at this time the first group of optical signals is not modulated with data yet) and a second group of optical signals including second split optical signals. The two groups of optical signals have one or more same wavelengths therebetween. For example, the first split optical signals and the second split optical signals have the same wavelengths. The first group of optical signals are used as downstream carriers for modulating downstream data. The second group of optical signals are used as upstream carriers. The processing module 2 further has a modulation function configured to modulate the downstream data in the first group of optical signals. The downstream data of each ONU is modulated to a corresponding wavelength.

The wavelength division multiplexing module 3 is connected to the processing module 2, and configured to perform wavelength division multiplexing on optical signals modulated with downstream data and to perform wavelength division multiplexing on the second group of optical signals, so as to form two paths of mixed optical signals respectively including the first group of optical signals modulated with the downstream data and the second group of optical signals used as upstream carriers. The first group of optical signals included in the two paths of mixed optical signals is modulated with downstream data.

The AWG in the prior art can be used to realize wavelength division multiplexing. For example, in FIG. 10, a first AWG device and a second AWG device each are used to realize 1×N wavelength division multiplexing/demultiplexing.

As shown in FIG. 10, the processing module in this embodiment can further include a splitting sub-module 23, a modulating sub-module 21, and an upstream carrier sub-module 22.

The splitting sub-module 23 is connected to the light source module 1, and configured to perform power splitting on each of a part or all of the group of optical signals where the group of optical signals have different wavelengths and are generated by the light source module 1. The first split optical signals are provided for the modulating sub-module 21 as downstream carrier for modulating downstream data. The second split optical signals are provided for the upstream carrier sub-module 22 as upstream carriers. The splitting sub-module 23 can be a virtual module having a plurality of discrete splitting components or an integrated module having a plurality of splitting components. Each splitting component is configured to perform power splitting on an optical signal generated by one light source into two paths of optical signals having the same wavelength therebetween.

The modulating sub-module 21 is connected to the wavelength division multiplexing module 3, and configured to receive the first group of optical signals. The first group of optical signals includes first split optical signals provided by the splitting sub-module 23. The modulating sub-module 21 modulates downstream data to the first group of optical signals. Each ONU corresponds to a carrier in the first group of optical signals. To distinguish the first group of optical signals and the second group of optical signals, the first group of optical signals carrying the downstream data each are labeled by a downstream (shortened as d) label. As shown in FIG. 10, the first group of optical signals are $\lambda_{1d}$, $\lambda_{2d}$, . . . , and $\lambda_{Nd}$. In this embodiment, a Mach-Zehnder modulator (MZM) is used as a modulation device. The modulating sub-module 21 can also be a virtual module including a plurality of discrete MZMs or an integrated module including a plurality of MZMs.

The upstream carrier sub-module 22 is connected to the wavelength division multiplexing module 3, and uses the generated second group of N optical signals having different wavelengths as upstream carriers. As shown in FIG. 10, the upstream carrier signals each are labeled by an upstream (shortened as u) label. The second group of optical signals is labeled as $\lambda_{1u}$, $\lambda_{2u}$, . . . , and $\lambda_{Nu}$. Upstream and downstream labels are added to label the first group of optical signals and the second group of optical signals, and if $\lambda_{1u}$ and $\lambda_{1d}$ represent the light having the same wavelength $\lambda_1$, $\lambda_{1u}$ and $\lambda_{1d}$ are simply used for labeling downstream carriers and upstream carriers respectively, and the rest follows the same rule.

If the power splitting is performed on all of the optical signals generated by the light source module 1 or the power splitting is performed on those optical signals having the number of carriers that equals the number of ONUs, the first group of optical signals provided for the modulating sub-module 21 to be used as downstream carriers are first split optical signals. If the power splitting is performed on a part of optical signals generated by the light source module 1 or the power splitting is performed on those optical signals having the number of carriers that is smaller than the number of the ONUs, the first group of optical signals provided for the modulating sub-module 21 to be used as downstream carriers further needs to include optical signals without undergoing power splitting. The optical signals without undergoing power splitting can be provided by the splitting sub-module 23 or can also be provided by the light source module 1 directly. Similarly, if the power splitting is performed on a part of optical signals generated by the light source module 1 or the power splitting is performed on those optical signals having the number of carriers that is smaller than the number of ONUs, the second group of optical signals provided for the upstream carrier sub-module 22 to be used as upstream carriers are second split optical signals. If the power splitting is performed on a part of optical signals generated by the light source module 1 or the number of carriers of the optical signals on which power splitting is performed is smaller than the number of the ONUs, the second group of optical signals provided for the upstream carrier sub-module 22 to be used as upstream carriers further needs to include optical signal without being split. The optical signals without being split can be provided by the splitting sub-module 23 or can be provided by the light source module 1 directly. In this embodiment, the generated N light source are used repetitively. The optical signals having different wavelengths are generated by a group of light sources and are divided into two groups. One group is configured to carry downstream data. The other group is used as upstream carriers. Therefore, light having the same wavelength generated by the same light source is used as upstream and downstream data carriers for different ONUS. Light generated by N light sources can be used as carriers of upstream and downstream data for N different ONUs. In the prior art, a system with N ONUs requires 2N light sources. In this embodiment, only N light sources need to be configured to provide carriers of upstream and downstream data. Therefore, the number of light sources used in a network can be reduced effectively, thus reducing system costs. Compared with the second technical solution in the prior art, in the present invention, the number of light sources can be reduced at low costs. Also, as wavelengths of upstream and downstream carriers are different, transmission quality of signals is greatly improved compared with the first technical solution in the prior art.

Figure 11:
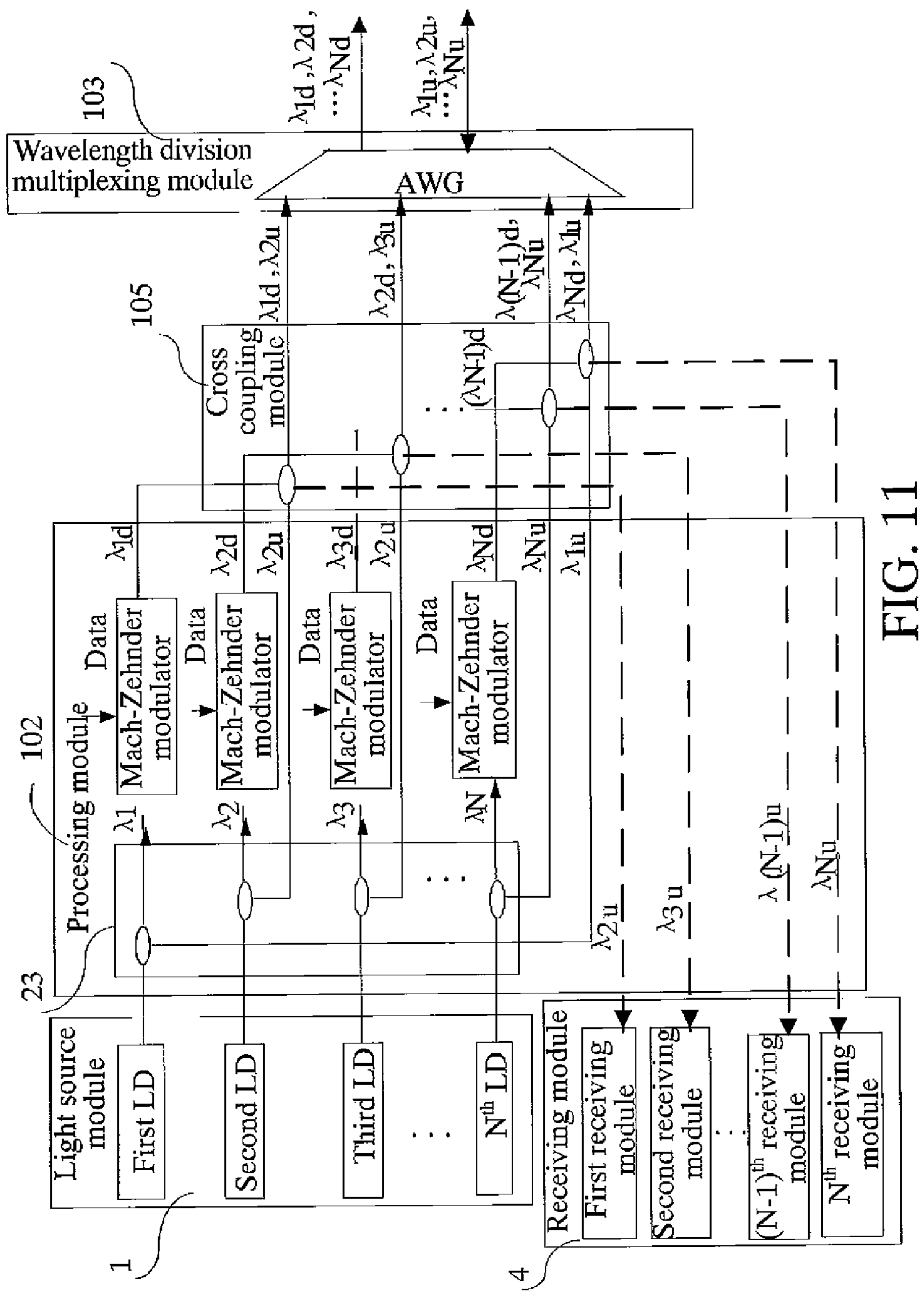
FIG. 11 is a schematic diagram of a second embodiment of an OLT according to the present invention.

FIG. 11 is a schematic diagram of a second embodiment of an OLT according to the present invention. This embodiment is similar to FIG. 10, and the same functions are omitted. The difference is that the OLT in this embodiment further includes a cross-coupling module 105, which is connected to the processing module 102 and the wavelength division multiplexing module 103. The cross-coupling module 105 is configured to perform cross-coupling on two optical signals that belong to the two groups of optical signals and whose wavelengths are different, so as to generate a plurality of carrier groups of signals.

In FIG. 11, a first carrier group of signals $\lambda_{1d}\lambda_{2u}$, a second carrier group of signals $\lambda_{2d}\lambda_{3u}$, . . . , and an $N^{th}$ carrier group of signals $\lambda_{Nd}\lambda_{1u}$ are obtained after cross-coupling, a 2×N AWG device is employed as the wavelength division multiplexing module 103. Specifically, the details may be obtained with reference to related illustrations in the embodiment in FIG. 7. Compared with the embodiment in FIG. 10, in this embodiment, an AWG device is reduced and costs are further saved.

In the foregoing only several examples of the OLT are provided, persons of ordinary skill in the art should understand that to satisfy different demands, the number M of light sources provided by a light source generating module can be configured as N+1 or N+2, different from FIGS. 10 and 11. The OLT in FIG. 13 has a structure different from that in FIGS. 10 and 11, which is specifically illustrated in the embodiment in FIG. 13.

Figure 12:
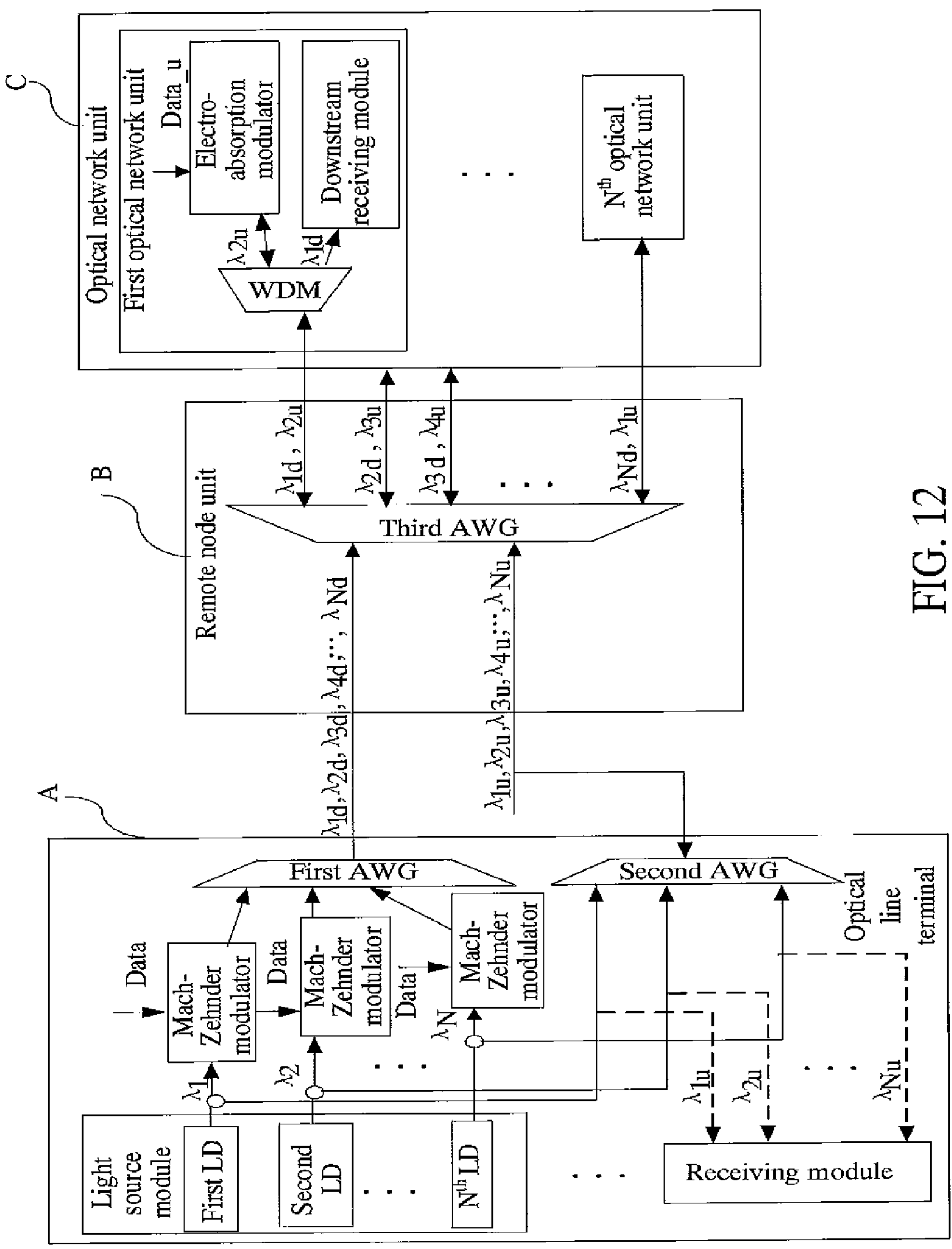
FIG. 12 is a schematic diagram of a first embodiment of an optical transmission system capable of reducing the number of light sources and a first embodiment of an RN unit according to the present invention.
Figure 13:
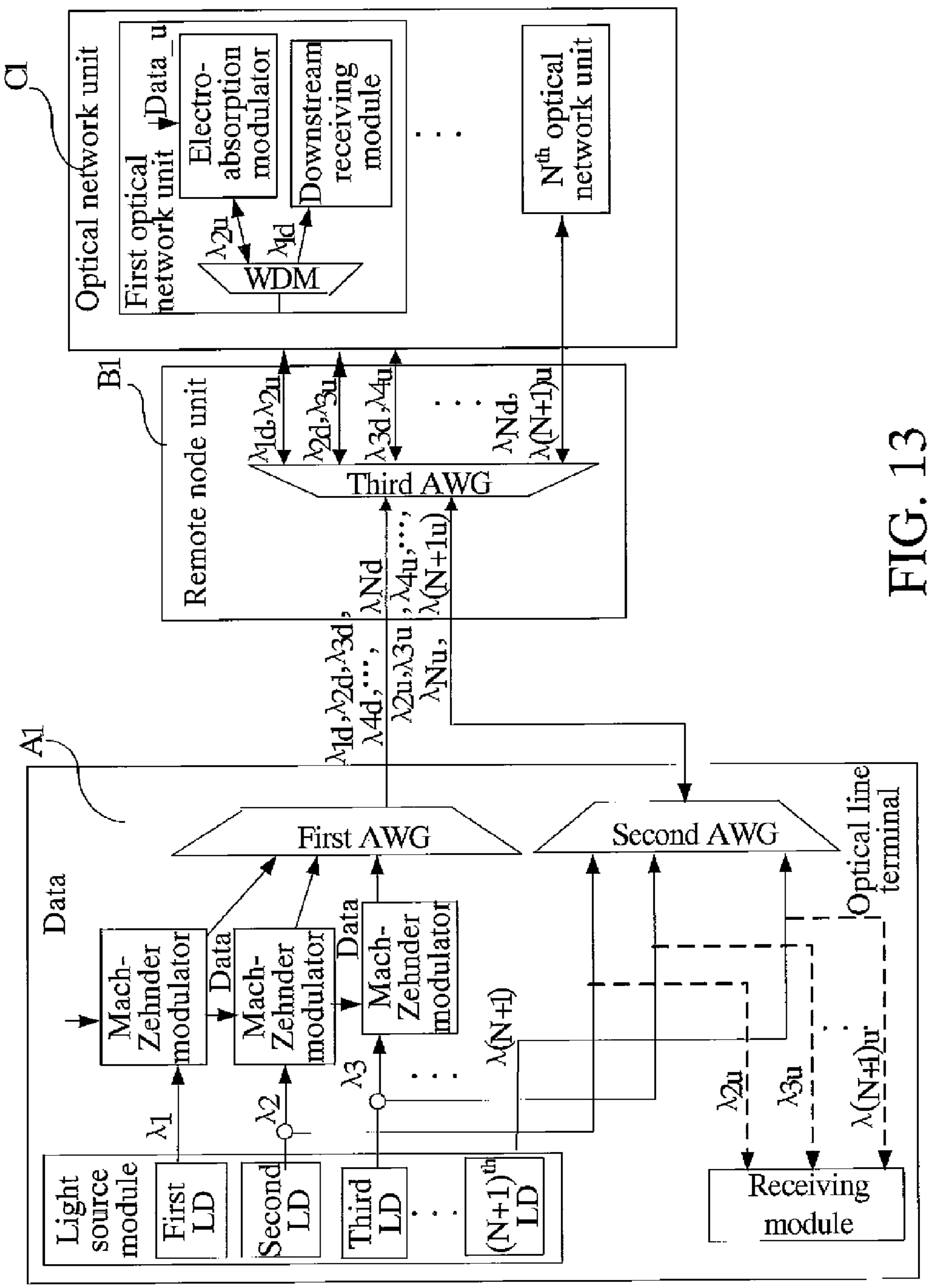
FIG. 13 is a schematic diagram of a second embodiment of an optical transmission system capable of reducing the number of light sources, a second embodiment of an RN unit, and a third embodiment of an OLT according to the present invention.

FIG. 12 is a schematic diagram of a first embodiment of an optical transmission system capable of reducing the number of light sources and a first embodiment of an RN unit according to the present invention.

In this embodiment, an RN unit B includes a cross routing module, which is connected to input two paths of mixed optical signals. The cross routing module is configured to perform cross routing on the input two paths of mixed optical signals to generate a plurality of carrier groups of signals. The plurality of carrier groups of signals are used as carriers for different ONUs. Each path of mixed optical signals of the two paths of mixed optical signals includes N carriers having different wavelengths. The two paths of mixed optical signals have one or more carriers having the same wavelength therebetween, and one path of mixed optical signals thereof is further modulated with downstream data. A third AWG device as shown in FIG. 12 may be employed as the cross routing module to implement the cross routing function.

In this embodiment, an optical transmission system capable of reducing the number of light sources is provided, which includes an OLT A, an RN unit B, and a plurality of ONUs C connected in sequence. The description of the OLT A may be obtained with reference to the illustration of embodiment in FIG. 10, and the OLT A has a similar structure as that in FIG. 10. The OLT A connects the generated two paths of mixed optical signals and the RN unit B through two independent optical media.

In the OLT, N light sources emit N paths of optical signals. Here the optical signals emitted by the light sources are consecutive light. Power splitting is performed on a part or all of the N paths of optical signals, so as to form a first group of optical signals including first split optical signals and a second group of optical signals including second split optical signals. The downstream data is modulated to the first group of optical signals. Wavelength division multiplexing is performed on the optical signals modulated with the downstream data via a first AWG at the OLT. Wavelength division multiplexing is directly performed on the second group of optical signals via a second AWG at the OLT, and the multiplexed second group of optical signals are used as upstream carriers delivered to the ONUs. The multiplexed two paths of mixed optical signals are transmitted through two optical fibers. One fiber is used for transmitting optical signals carrying downstream data and the other fiber is used for transmitting optical signals as upstream carriers. Here, the first group of optical signals may only include first split optical signals (the number M of light sources is equal to the number N of the ONUs or the power splitting is performed on all optical signals generated by the light sources). Of course, the first group of optical signals can include both the first split optical signals and other optical signals (the number M of the light sources is greater than the number N of the ONUs or the power splitting is performed on optical signals generated by the light sources). The second group of optical signals may only include the second split optical signals (the number M of the light sources is equal to the number N of the ONUs or the power splitting is performed on all optical signals generated by the light sources). Of course, the second group of optical signals can include both the second split optical signals and other optical signals (the number M of the light sources is greater than the number N of the ONUs or the power splitting is performed on part of optical signals generated by the light sources).

In the RN unit B, two optical fibers are connected to a 2×N third AWG device. Due to a cross routing feature of the AWG device, its N output ports each output a carrier group of signals having one downstream data signal and one upstream carrier. As shown in FIG. 12, a first output port outputs ($\lambda_{1d}$, $\lambda_{2u}$), a second output port outputs ($\lambda_{2d}$, $\lambda_{3u}$), . . . , and $N^{th}$ output port outputs ($\lambda_{Nd}$, $\lambda_{1u}$). As a free spectral range (FSR) of each AWG device is fixed, cross routing of wavelengths can only be realized when a certain work wavelength relation is satisfied, so as to output carrier groups of signals having a plurality of different wavelengths. To realize this cross routing feature, in this embodiment, work wavelengths of N light sources and the FSR of the third AWG device need to be properly selected.

Each carrier group of signals output by the RN unit B corresponds to a certain ONU of the plurality of ONUs C. For example, the output port 1 corresponds to the first ONU 1, . . . , and the output port N corresponds to the $N^{th}$ ONU. Each ONU, for example, the first ONU, includes a filtering module, a modulating module, and a downstream receiving module.

The filtering module is connected to the RN unit B, and configured to filter the received a carrier group of signals, so as to separate the received carrier group of signals into two different wavelengths. In FIG. 12, the first ONU is configured to employ a WDM device for filtering. It should be noted that the optical transmission system in this embodiment includes the filtering module. However, in other network structures, filtering is not necessarily needed, and thus the filtering module may be not required.

The modulating module is connected to the filtering module, and configured to receive the filtered upstream carrier signal, modulate upstream data, and send the upstream carrier signal modulated with the upstream data to the OLT via the RN through a reversible path of a reception channel. The filtered upstream carrier signal is sent to a modulation device, such as an electro-absorption modulator (EAM) at low costs as shown in FIG. 12, for modulating the upstream data. The upstream carrier signal modulated with the upstream data is transmitted through the reversible path to a receiving (Rx) module at the OLT.

The downstream receiving module is connected to the filtering module, and configured to receive a downstream carrier signal carrying the downstream data and perform detection on the received downstream carrier signal to obtain the downstream data. As in FIG. 12, a downstream data signal of the first carrier group of signals is transmitted to a receiving module at a first ONU.

In this embodiment, an optical transmission system and RN unit which are capable of reducing the number of light sources in the network are provided. N light sources having different wavelengths are used. Power splitting is performed on the light source signals to generate two groups of optical signals each having N different wavelengths. Subsequently, the RN unit performs cross routing, and optical signals which have the same wavelength therebetween and are generated by a certain same light source are used for different ONUs as upstream and downstream carriers each. A group of light sources can be used to generate upstream and downstream carriers for different ONUs. Compared with the second technical solution in the prior art, in the present invention, a mature and simple device at low costs is used, so as to reduce the number of the light sources. Also, as the wavelengths of the upstream and downstream carriers are different, reception quality is greatly increased compared with first technical solution in the prior art.

FIG. 13 is a schematic diagram of a second embodiment of an optical transmission system capable of reducing the number of light sources, a second embodiment of an RN unit, and a third embodiment of an OLT according to the present invention. FIG. 13 is similar to the embodiment in FIG. 12. The difference is the internal structure of the OLT. In this embodiment, the two paths of mixed optical signals generated by the OLT A1 also do not have completely same wavelengths. The two paths of mixed optical signals input by the RN unit B do not have completely same wavelengths. As can be seen through the embodiment in FIG. 12, when the third AWG device in the RN unit B in the embodiment in FIG. 12 performs cross routing on the input optical signals, it is hard to design and implement the third AWG for outputting the optical wavelength combination ($\lambda_{Nd}$, $\lambda_{1u}$) at the last output port. In this embodiment, for a system having N ONUs, (N+1) light sources having different wavelengths are used at the OLT A1. The (N+1) light sources having different wavelengths are divided into two groups. The first group of optical signals includes $\lambda_{1d}$, $\lambda_{2d}$, . . . , and $\lambda_{Nd}$. The second group of optical signals includes $\lambda_{2u}$, $\lambda_{3u}$, . . . , and $\lambda_{(N+1)u}$. During the cross routing at the RN unit B1, the output port N outputs ($\lambda_{Nd}$, $\lambda_{(N+1)u}$) to the $N^{th}$ ONU in the ONU C1. The $\lambda_{Nd}$ and $\lambda_{(N+1)u}$ are used as downstream and upstream carriers for the $N^{th}$ ONU respectively. Specifically, details may be obtained with reference to the related illustration of the method embodiment, and are not repeated here.

FIG. 14 is a schematic diagram of a third embodiment of an optical transmission system capable of reducing the number of light sources according to the present invention. The OLT in this embodiment has a structure similar to that in the embodiment in FIG. 11. The system in this embodiment is different from those in the embodiments in FIGS. 12 and 13. In this embodiment, cross-coupling is used inside the OLT A2 and a wavelength division multiplexing device is used to implement wavelength division multiplexing of two groups of optical signals obtained after cross-coupling. Specifically, details may be obtained with reference to the method embodiment in FIG. 7 and the OLT in FIG. 11.

Figure 15A:
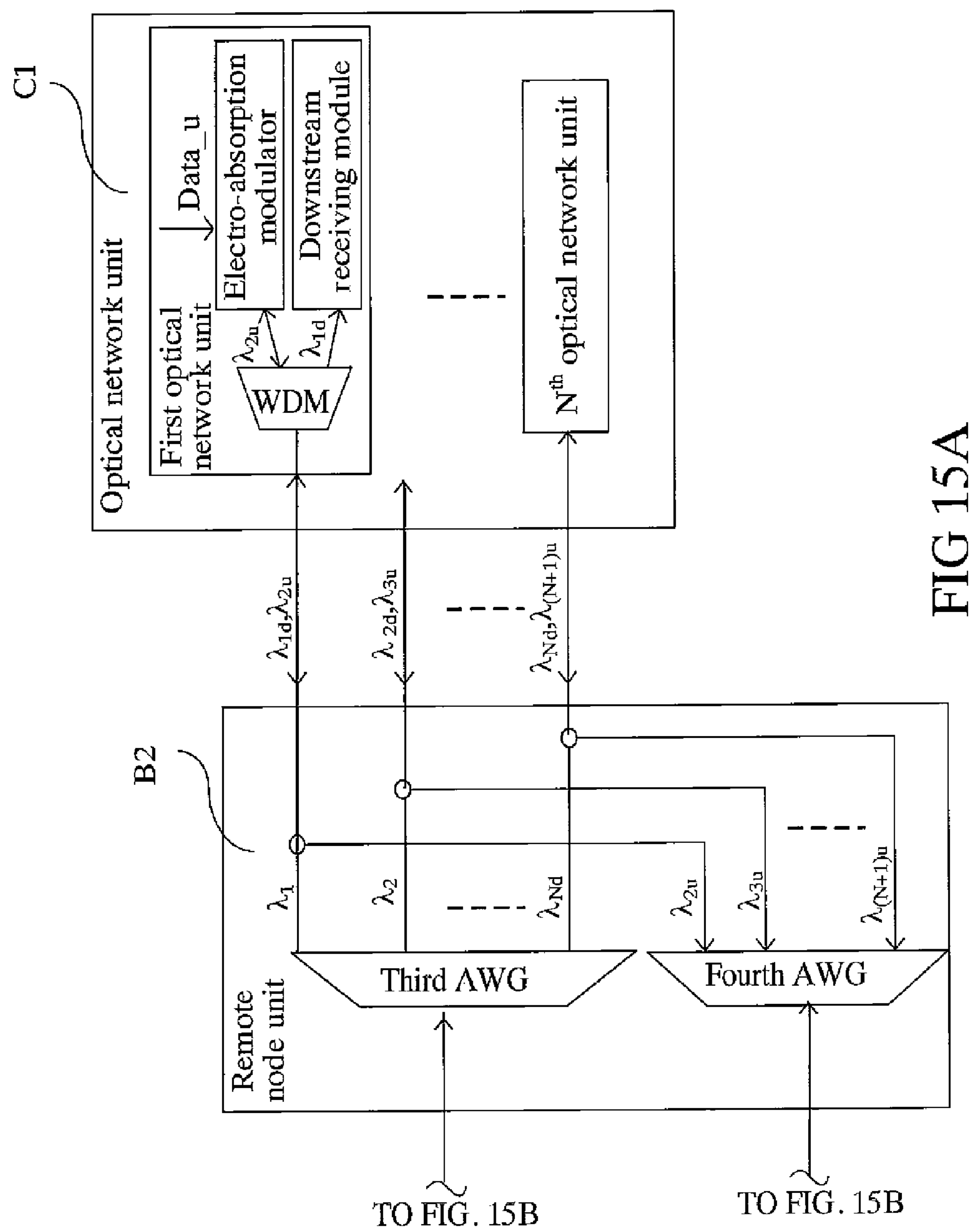
FIG. 15 is a schematic diagram of a fourth embodiment of an optical transmission system capable of reducing the number of light sources and a third embodiment of an RN unit according to the present invention.
Figure 15B:
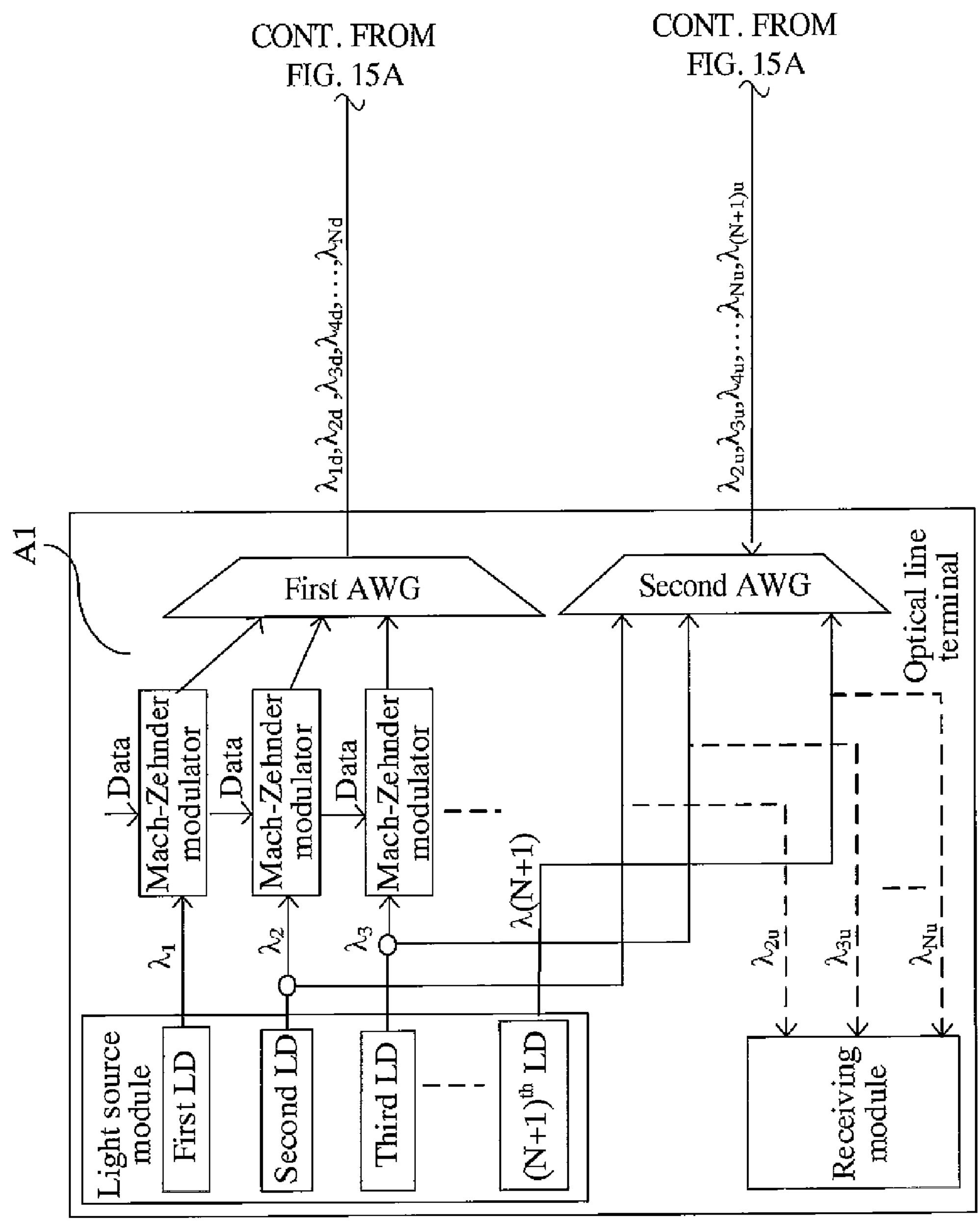

For the wavelength division devices of the RN units in the embodiments in FIGS. 12 and 13, only one 2×N AWG device is used to implement cross routing. However, persons of ordinary skill in the art should understand that for the wavelength division devices in the RN unit, two 1×N AWG devices can also be used to perform wavelength division multiplexing on the two paths of mixed optical signals according to the same structural principles inside the OLTs in FIGS. 10 and 11. Next, cross routing is performed on the signals obtained after wavelength division multiplexing, so as to form N carrier groups of signals to be sent to each ONU. Referring to FIG. 15, a schematic diagram of a fourth embodiment of an optical transmission system capable of reducing the number of light sources and a third embodiment of an RN unit according to the present invention is shown. The cross routing module of the RN unit B2 has the same function as that in FIG. 13, but is implemented in different modes, after performing wavelength division multiplexing by the third AWG and fourth AWG devices and then crossing, a plurality of carrier groups of signals is formed to be used as carriers for ONUs of the ONU C1.

FIG. 16 is a schematic diagram of a fifth embodiment of an optical transmission system capable of reducing the number of light sources according to and a fourth embodiment of an RN unit according to the present invention. The RN unit in the embodiment in FIG. 16 is different from those in FIGS. 12 to 15. The RN unit B3 in this embodiment includes a splitting module B31 and a cross routing module B33.

The splitting module B31 is configured to perform power splitting on one path of mixed optical signals having N different wavelengths to form two paths of mixed optical signals having the same wavelength therebetween as the path of mixed optical signals.

The cross routing module B33 is connected to the splitting module B31, and configured to input the two paths of mixed optical signals, perform cross routing on the two paths of mixed optical signals to generate a plurality of carrier groups of signals, and use the plurality of carrier groups of signals as upstream carriers for different ONUs. Each carrier group of signals include two optical signals having different wavelengths, and the two optical signals having different wavelengths included in each carrier group of signals belong to two paths of mixed optical signals. The third AWG device in the embodiment in FIG. 16 is used to realize a cross routing function. Only one wavelength division multiplexing (WDM) device B32 may be used to perform wavelength division multiplexing on downstream signals, and subsequently the downstream signals obtained after wavelength division multiplexing are used as downstream signals for different ONUs.

In the embodiment in FIG. 16, N+1 light sources are used to realize carriers for N ONUs. As shown in FIG. 16, each ONU in the plurality of ONU C3s in this embodiment corresponds to three carrier groups of signals having different wavelengths. Each carrier group of signals include one upstream carrier and two upstream carriers. The internal structures of the OLT and ONU are illustrated in detail in the foregoing embodiments, the description of which is omitted here. Compared with the prior art, this embodiment reduces about 2N light sources and can be implemented with mature devices with low costs.

FIG. 17 is a schematic diagram of a sixth embodiment of an optical transmission system capable of reducing the number of light sources according to the present invention. The internal structure of the RN unit in this embodiment is similar to that in FIG. 16. The OLT A3 is different from those in the embodiments in FIGS. 12 to 16. The OLT A3 in this embodiment uses 2N light sources having different wavelengths. Optical signals generated by one group of N light sources having different wavelengths are used as downstream carriers. Optical signals generated by another group of N light sources having different wavelengths are used as upstream carriers. For example, a group of N wavelength optical signals which have different wavelengths and are generated by a first LD to an $N^{th}$ LD in a light source module A31 is used as downstream carriers. Another group of N wavelength optical signals which have different wavelengths and are generated by an $(N+1)^{th}$ LD to a $2N^{th}$ LD in a light source module A32 is used as upstream carriers. Two paths of upstream carrier mixed optical signals are formed by a splitting module in an RN unit B4 to perform power splitting on the another group of N wavelength optical signals as upstream carriers. Through subsequent cross routing, carriers for different ONUs are generated. In this embodiment, the OLT is not improved. However, as the RN unit B4 performs power splitting and subsequent cross routing, for a system having N ONUs, 2N light sources can be used to generate 3N carrier signals. Compared with the prior art, N light sources are reduced. In this embodiment, optical signals used as upstream carriers generated by N light sources provide 2N upstream carriers for N ONUs after power splitting. Similar to the foregoing, optical signals used as upstream carriers generated by N+1, . . . , and 2N−1 light sources can also provide 2N upstream carriers for N ONUs.

FIG. 18 is a schematic diagram of a seventh embodiment of an optical transmission system capable of reducing the number of light sources and a fifth embodiment of an RN unit according to the present invention. In this embodiment, an internal structure of the OLT is the same as that in the embodiment in FIG. 14. The RN unit is similar to that in FIG. 16. The whole structure is similar to that in the embodiment in FIG. 16. However, in FIG. 16 N+1 light sources need to be used, and in FIG. 18 N light sources need to be used. In this embodiment, internal structures of the OLT A2, the RN unit B5, and the ONU C5 are similar to those in the foregoing embodiments. Only the wavelengths of the carrier signals are different. Further description is omitted here.

FIG. 19 is a schematic diagram of an eighth embodiment of an optical transmission system capable of reducing the number of light sources and a sixth embodiment of an RN unit according to the present invention. An RN unit B6 in this embodiment includes a separating module B61 and a cross routing module B62.

The separating module B61 is configured to perform power splitting on one path of mixed optical signals (not modulated with downstream data) in two paths of mixed optical signals to form two paths of mixed optical signals having the same wavelengths as the mixed optical signals.

The cross routing module B62 is connected to the splitting module B61, and configured to perform cross routing on three paths of mixed optical signals including two paths of mixed optical signals obtained after power branching that are input by the splitting module B61 and one path of optical signals without undergoing power splitting (modulated with the downstream data), so as to generate a plurality of carrier groups of signals. The plurality of carrier groups of signals is used as carriers for different ONUs. Each carrier group of signals includes three optical signals having different wavelengths and the three optical signals having different wavelengths included in each carrier group of signals belong to three paths of mixed optical signals input in the cross routing module B62.

In this embodiment, the optical transmission system capable of reducing the number of light sources includes an OLT A3 and an RN unit B6.

The OLT A3 is configured to generate two groups of optical signals with two groups of light sources. Wavelength division multiplexing is performed on the two groups of optical signals, so as to form two paths of mixed optical signals including the two groups of optical signals, i.e. a first group of optical signals and a second group of optical signals. The two groups of light sources have different wavelengths.

The RN unit B6 is configured to perform cross routing on input two paths of mixed optical signals by connecting two independent optical media and the OLT, so as to generate a plurality of carrier groups of signals. The plurality of carrier groups of signals are used as carriers for different ONUs.

The OLT and ONU in this embodiment are the same as those in FIG. 17. However, compared to the embodiment in FIG. 17, for the RN unit, an AWG device is used as a cross routing module, so as to realize cross routing on the three paths of mixed optical signals. Each carrier group of signals includes three carriers, which are sent to an ONU. In this embodiment, the two paths of mixed optical signals generated by the OLT have different wavelengths.

FIG. 20 is a schematic diagram of a ninth embodiment of an optical transmission system capable of reducing the number of light sources and a seventh embodiment of an RN unit according to the present invention. The embodiment in FIG. 20 is similar to that in FIG. 19, in which an AWG device is used as a cross routing module, but the OLT in FIG. 20 is different from that in FIG. 19. The OLT A1 in this embodiment has the same structure as that in the embodiment in FIG. 16. The two paths of mixed optical signals generated by the OLT A1 have N−1 same wavelengths. The OLT A1 and ONU C3 in this embodiment are the same as those in the embodiment in FIG. 16. However, the RN unit B7 in this embodiment is similar to that in the embodiment in FIG. 19.

The present invention has a plurality of implementation modes in different forms. The technical solutions of the present invention are illustrated with reference to the accompanying drawings such as FIG. 4 to FIG. 20. This does not mean that the specific examples of the present invention should be limited to the specific flow charts and structures in the embodiments. Persons of ordinary skill in the art should understand that the specific implementation schemes in the foregoing are only some examples among a plurality of preferred modes. Any mode in which a group of optical signals is used repetitively and divided into two groups of optical signals each having different wavelengths, the two groups of optical signals have one or more same wavelengths, the optical signals are separately transmitted through different media, and two groups of optical signals are separately used as upstream and downstream carrier signals through cross routing should fall within the scope of the technical solutions of the present invention.

Persons of ordinary skill in the art may understand that all or part of the steps in the preceding embodiments may be performed on hardware by following instructions of a program. The program may be stored in a computer readable storage medium such as a Read-Only Memory (ROM), a Random Access Memory (RAM), a magnetic disk, a compact disk or any medium that is capable of storing the program codes. When the program is run, the steps of the methods according to the embodiments of the present invention are performed.

Finally, it should be noted that the above embodiments are merely provided for elaborating the technical solutions of the present invention, but not intended to limit the present invention. It should be understood by persons of ordinary skill in the art that although the present invention has been described in detail with reference to the foregoing embodiments, modifications can be made to the technical solutions described in the foregoing embodiments, or equivalent replacements can be made to some technical features, as long as such modifications or replacements do not cause the nature and essence of corresponding technical solutions to depart from the scope of the present invention.

What is claimed is:

1. An optical transmission method, wherein M light sources on an optical line terminal (OLT) provide K carriers for N optical network units (ONUs), M, N, and K are integers greater than 1, and K>M>=N, comprising:

separately performing power splitting on a part or all of M optical signals which have different wavelengths and are generated by the M light sources, to form a first group of optical signals comprising first split optical signals and a second group of optical signals comprising second split optical signals, wherein the first group of optical signals and the second group of optical signals both have N different wavelengths;

performing cross routing on the first group of optical signals and the second group of optical signals to form N carrier groups of signals that need to be provided to the N ONUs, wherein the N carrier groups of signals have K carriers in total, each carrier group of signals comprise a carrier in the first group of optical signals and a carrier in the second group of optical signals, and carriers in each carrier group of signals have different wavelengths;

wherein the first group of optical signals are used as downstream carriers and the second group of optical signals are used as upstream carriers, and the method further comprises:

modulating, at the OLT, the downstream data to the first group of optical signals, and sending the first group of optical signals modulated with the downstream data and the second group of optical signals to a remote node (RN) unit between the OLT and the ONU through a first optical medium and a second optical medium respectively;

wherein performing cross routing on the first group of optical signals and the second group of optical signals to form N carrier groups of signals that need to be provided to N ONUs comprises:

performing, at the RN unit, cross routing on the first group of optical signals modulated with the downstream data from the first optical medium and the second group of optical signals from the second optical medium to form N carrier groups of signals that need to be provided to the N ONUs;

wherein each carrier group of signals comprise two upstream carriers having different wavelengths, and the performing, at the RN unit, and cross routing on the first group of optical signals modulated with downstream data from the first optical medium and the second group of optical signals from the second optical medium to form N carrier groups of signals to be provided to N ONUs comprises:

performing, at the RN unit, power splitting on a part or all of the second group of optical signals from the second optical medium to form a third group of optical signals and a fourth group of optical signals each having the same wavelength as the second group of optical signals, and performing cross routing on the third group of optical signals, the fourth group of optical signals, and the first group of optical signals modulated with the downstream data from the first optical medium to form N carrier groups of signals that need to be provided for the N ONUs, wherein each carrier group of signals have a carrier in the third group of optical signals, a carrier in the fourth group of optical signals, and a carrier in the first group of optical signals modulated with the downstream data from the first optical medium; or performing, at the RN unit, power splitting on a part or all of the second group of optical signals from the second optical medium to form a third group of optical signals and a fourth group of optical signals that have the same wavelength as the second group of optical signals, performing cross routing on the third group of optical signals and the fourth group of optical signals to form N upstream carrier groups of signals, and performing cross-coupling on the N upstream carrier groups of signals and N downstream carrier signals in the first group of optical signals modulated with the downstream data from the first optical medium to form N carrier groups of signals to be provided to the N ONUs, wherein each carrier group of signals have two carriers in the upstream carrier groups of signals and a carrier in the first group of optical signals modulated with the downstream data from the first optical medium.

2. The method according to claim 1, wherein performing cross routing on the first group of optical signals and the second group of optical signals to form the N carrier groups of signals that need to be provided to the N ONUs further comprises:

performing, at the OLT, cross-coupling on the first group of optical signals modulated with the downstream data and the second group of optical signals to form N carrier groups of signals that need to be provided to the N ONUs.

3. A remote node (RN) unit, comprising:

a cross routing module, configured to perform cross routing on input multiple paths of mixed optical signals, so as to construct a plurality of carrier groups of signals having different wavelengths, wherein the plurality of carrier groups of signals is used as carriers for different optical network units (ONUs);

wherein each path of mixed optical signals in the multiple paths of mixed optical signals comprises multiple carriers having different wavelengths, and the multiple paths of mixed optical signals comprise one or more carriers having the same wavelength;

at least one separating module, configured to send a first path in the two paths of mixed optical signals to a cross routing module, perform power splitting on the second path of mixed optical signals to form a third path of mixed optical signals and a fourth path of mixed optical signals each having the same wavelength as the second path of mixed optical signals, and send the third path of mixed optical signals and the fourth path of mixed optical signals to the cross routing module, wherein each path of mixed optical signals in the third path of mixed optical signals and the fourth path of mixed optical signals comprises a plurality of different wavelengths; and the cross routing module, connected to the separating module, and configured to input three paths of mixed optical signals comprising the first path of mixed optical signals, the second path of mixed optical signals, and the third path of mixed optical signals and perform cross routing on the three paths of mixed optical signals to construct a plurality of carrier groups of signals comprising different wavelengths, wherein the plurality of carrier groups of signals is used as carriers for different ONUs, and each carrier group of signals comprises a carrier in the three paths of mixed optical signals.

4. The RN unit according to claim 3, further comprising:

a splitting module, configured to perform power splitting on one path of mixed optical signals comprising multiple different wavelengths to form two paths of mixed optical signals having the same wavelength, and send the two paths of mixed optical signals to a cross routing module;

the cross routing module, connected to the splitting module, and configured to input the two paths of mixed optical signals and perform cross routing on optical signals belonging to the two paths of mixed optical signals and having different wavelengths to form a plurality of carrier groups having different wavelengths, wherein the plurality of carrier groups is used as carriers for different ONUs.

5. An optical transmission system, comprising:

an optical line terminal (OLT) generating M optical signals having different wavelengths, a remote node (RN) unit, and N optical network units (ONUs) connected in sequence, wherein the OLT provides K carriers for the N ONUs, M, N, and K are integers greater than 1, and K>M>=N;

the OLT is configured to generate a group of light sources having M different wavelengths, perform power splitting on part of or all light sources respectively to generate a first group of optical signals comprising first split optical signals and a second group of optical signals comprising second split optical signals, modulate downstream data to the first group of optical signals, and perform wavelength division multiplexing on the first group of optical signals modulated with the downstream data and the second group of optical signals respectively to form two paths of mixed optical signals respectively comprising the first group of optical signals modulated with the downstream data and the second group of optical signals; and the RN unit is connected to the OLT, and configured to perform cross routing on the input two paths of mixed optical signals to construct a plurality of carrier groups of signals having different wavelengths, wherein the plurality of carrier groups of signals is used as carriers for different ONUs, each carrier group of signals comprises a carrier in the mixed optical signals not modulated with downstream data in the two paths of mixed optical signals and a carrier in the mixed optical signals modulated with the downstream data in the two paths of mixed optical signals; and wherein the RN unit further comprises:

a splitting module, configured to perform power splitting on the mixed optical signals not modulated with the downstream data to form two paths of mixed optical signals each having the same wavelength as the mixed optical signals;

a cross routing module, connected to the splitting module, and configured to perform cross routing on optical signals belonging to the two paths of mixed optical signals obtained after the power splitting and having different wavelengths to generate a plurality of carrier groups of signals, wherein the plurality of carrier groups of signals are used as upstream carriers for different ONUs; and a wavelength division multiplexing module, configured to perform wavelength division multiplexing on mixed optical signals modulated with the downstream data to generate a plurality of downstream carriers for different ONUs.

6. The optical transmission system according to claim 5, wherein the RN unit is a 2×N arrayed waveguide grating (AWG) device, configured to perform cross routing on the two paths of mixed optical signals to generate N carrier groups of signals, and the N carrier groups of signals are separately used as carriers for N ONUs.

7. An optical transmission system, comprising:

an optical line terminal (OLT) generating M optical signals having different wavelengths, a remote node (RN) unit, and N optical network units (ONUs) connected in sequence, wherein the OLT provides K carriers for the N ONUs, M, N, and K are integers greater than 1, and K>M>=N;

the OLT is configured to generate a group of light sources having M different wavelengths, perform power splitting on part of or all light sources respectively to generate a first group of optical signals comprising first split optical signals and a second group of optical signals comprising second split optical signals, modulate downstream data to the first group of optical signals, and perform wavelength division multiplexing on the first group of optical signals modulated with the downstream data and the second group of optical signals respectively to form two paths of mixed optical signals respectively comprising the first group of optical signals modulated with the downstream data and the second group of optical signals;

the RN unit is connected to the OLT, and configured to perform cross routing on the input two paths of mixed optical signals to construct a plurality of carrier groups of signals having different wavelengths, wherein the plurality of carrier groups of signals is used as carriers for different ONUs, each carrier group of signals comprises a carrier in the mixed optical signals not modulated with downstream data in the two paths of mixed optical signals and a carrier in the mixed optical signals modulated with the downstream data in the two paths of mixed optical signals; and wherein the RN unit further comprises:

a separating module, configured to perform power splitting on one path of mixed optical signals not modulated with the downstream data in the two paths of mixed optical signals to form two paths of mixed optical signals having the same wavelength as the mixed optical signals; and a cross routing module, connected to the separating module, and configured to input two paths of mixed optical signals after power splitting and one path of mixed optical signals modulated with the downstream data, perform cross routing on optical signals respectively in the three paths of mixed optical signals and having different wavelengths to generate a plurality of carrier groups of signals, wherein the plurality of carrier groups of signals is used as carriers for different ONUs.

* * * * *